US008785562B2

(12) United States Patent
Hagadorn et al.

(10) Patent No.: US 8,785,562 B2
(45) Date of Patent: Jul. 22, 2014

(54) AMPHIPHILIC BLOCK POLYMERS PREPARED BY ALKENE METATHESIS

(75) Inventors: John R. Hagadorn, Houston, TX (US); Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 375 days.

(21) Appl. No.: 13/072,261

(22) Filed: Mar. 25, 2011

(65) Prior Publication Data
US 2012/0245298 A1 Sep. 27, 2012

(51) Int. Cl.
*C08F 290/04* (2006.01)
*C08F 290/06* (2006.01)
*C08G 61/12* (2006.01)

(52) U.S. Cl.
CPC .......... *C08F 290/04* (2013.01); *C08F 290/06* (2013.01); *C08F 290/042* (2013.01); *C08F 290/062* (2013.01); *C08G 61/12* (2013.01); *C08G 2261/126* (2013.01); *C08G 2261/419* (2013.01); *Y10S 525/91* (2013.01); *Y10S 525/925* (2013.01)
USPC ............ 525/299; 525/187; 525/910; 525/925

(58) Field of Classification Search
CPC ............... C08F 290/042; C08F 290/04; C08F 290/062; C08F 290/06; C08G 2261/126; C08G 61/12; C08G 2261/419
USPC .................................. 525/187, 319, 910, 925
See application file for complete search history.

(56) References Cited

U.S. PATENT DOCUMENTS

| | | | |
|---|---|---|---|
| 3,022,305 A | 2/1962 | Carboni | |
| 3,235,484 A | 2/1966 | Colfer | |
| 4,069,023 A | 1/1978 | Brois et al. | |
| 4,110,377 A | 8/1978 | Clerici et al. | |
| 4,197,398 A | 4/1980 | Floyd et al. | |
| 4,619,756 A | 10/1986 | Dickakian | |
| 4,814,540 A | 3/1989 | Watanabe et al. | |
| 4,973,414 A | 11/1990 | Nerger et al. | |
| 4,988,764 A | 1/1991 | Nishio et al. | |
| 5,026,948 A | 6/1991 | Forbus | |
| 5,049,535 A | 9/1991 | Resconi et al. | |
| 5,211,834 A | 5/1993 | Forester | |
| 5,229,022 A | 7/1993 | Song et al. | |
| 5,252,677 A | 10/1993 | Tomita et al. | |
| 5,266,186 A | 11/1993 | Kaplan | |
| 5,382,634 A | 1/1995 | Koyama et al. | |
| 5,439,607 A | 8/1995 | Patil | |
| 5,444,125 A | 8/1995 | Tomita et al. | |
| 5,498,809 A | 3/1996 | Emert et al. | |
| 5,504,172 A | 4/1996 | Imuta et al. | |
| 5,705,577 A | 1/1998 | Rossi et al. | |
| 5,741,946 A | 4/1998 | Wei | |
| 5,744,541 A | 4/1998 | Sawaguchi et al. | |
| 5,750,815 A | 5/1998 | Grubbs et al. | |
| 5,756,428 A | 5/1998 | Emert et al. | |
| 5,811,379 A | 9/1998 | Rossi et al. | |
| 5,859,159 A | 1/1999 | Rossi et al. | |
| 5,936,041 A | 8/1999 | Diana et al. | |
| 6,017,859 A | 1/2000 | Rossi et al. | |
| 6,114,445 A | 9/2000 | Tzoganakis et al. | |
| 6,117,962 A | 9/2000 | Weng et al. | |
| 6,143,686 A | 11/2000 | Vizzini et al. | |
| 6,197,910 B1 | 3/2001 | Weng et al. | |
| 6,225,432 B1 | 5/2001 | Weng et al. | |
| 6,255,426 B1 | 7/2001 | Lue et al. | |
| 6,268,518 B1 | 7/2001 | Resconi et al. | |
| 6,410,666 B1 | 6/2002 | Grubbs et al. | |
| 6,444,773 B1 | 9/2002 | Markel | |
| 6,448,350 B1 | 9/2002 | Dall'Occo et al. | |
| 6,476,167 B2 | 11/2002 | Peters | |
| 6,525,157 B2 | 2/2003 | Cozewith et al. | |
| 6,703,457 B2 | 3/2004 | Van Baar et al. | |
| 6,750,307 B2 | 6/2004 | Weng et al. | |
| 6,897,261 B1 | 5/2005 | Machida et al. | |
| 6,939,930 B2 | 9/2005 | Reinking et al. | |
| 7,126,031 B2 | 10/2006 | Boussie et al. | |
| 7,247,385 B1 | 7/2007 | Tzoganakis et al. | |

(Continued)

FOREIGN PATENT DOCUMENTS

CN 101011062 8/2007
EP 0 767 182 4/1997

(Continued)

OTHER PUBLICATIONS

Britovsek et al., *Novel Olefin Polymerization Catalysts Based on Iron and Cobalt*, Chemical Communications, 1998, No. 7, pp. 849-850.

(Continued)

*Primary Examiner* — Mark Kaucher
(74) *Attorney, Agent, or Firm* — Kevin M. Faulkner; Catherine L. Bell

(57) ABSTRACT

The invention relates to a multiblock polyolefin, and methods to make a multiblock polyolefin, represented by the formula (X) or (XII):

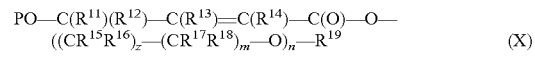

or

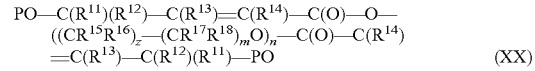

wherein $R^{11}$, $R^{12}$, $R^{13}$, and $R^{14}$ are each independently a substituted or unsubstituted $C_1$ through $C_4$ hydrocarbyl group or a hydrogen; $R^{15}$, $R^{16}$, $R^{17}$, and $R^{18}$ are each independently a substituted or unsubstituted $C_1$ through $C_4$ hydrocarbyl group or a hydrogen; $R^{19}$ is a $C_1$ to a $C_{20}$ substituted or unsubstituted hydrocarbyl group or a hydrogen; z is ≥1 to about 5; m is ≥1 to about 5; PO is a polyolefin hydrocarbyl group comprising 10 to 4000 carbon atoms; and n is from 1 to about 10,000.

10 Claims, No Drawings

(56) References Cited

U.S. PATENT DOCUMENTS

| | | | |
|---|---|---|---|
| 7,276,567 B2 | 10/2007 | Voskoboynikov et al. | |
| 7,294,681 B2 | 11/2007 | Jiang et al. | |
| 7,524,910 B2 | 4/2009 | Jiang et al. | |
| 7,541,413 B2 | 6/2009 | Crowther et al. | |
| 7,589,160 B2 | 9/2009 | Resconi et al. | |
| 7,790,810 B2 | 9/2010 | Coates et al. | |
| 7,820,607 B2 | 10/2010 | Matsuda et al. | |
| 7,897,679 B2 | 3/2011 | Stevens et al. | |
| 7,943,716 B2 | 5/2011 | Resconi et al. | |
| 7,960,487 B2 | 6/2011 | Yang et al. | |
| 8,058,351 B2 | 11/2011 | Pawlow et al. | |
| 2002/0137978 A1 | 9/2002 | Grubbs et al. | |
| 2003/0161752 A1 | 8/2003 | Luk et al. | |
| 2004/0054086 A1 | 3/2004 | Schauder et al. | |
| 2004/0127649 A1 | 7/2004 | Arjunan | |
| 2004/0214953 A1 | 10/2004 | Yamada et al. | |
| 2004/0249046 A1 | 12/2004 | Abhari et al. | |
| 2005/0054793 A1 | 3/2005 | Reinking et al. | |
| 2005/0159299 A1 | 7/2005 | Rodriguez et al. | |
| 2005/0261440 A1 | 11/2005 | Dickakian et al. | |
| 2006/0052553 A1 | 3/2006 | Resconi et al. | |
| 2006/0270814 A1 | 11/2006 | Mako et al. | |
| 2007/0293640 A1 | 12/2007 | Jiang et al. | |
| 2008/0228017 A1 | 9/2008 | Burdett et al. | |
| 2008/0234451 A1 | 9/2008 | Kenwright et al. | |
| 2009/0198089 A1 | 8/2009 | Burton et al. | |
| 2009/0221750 A1 | 9/2009 | Tsunogae et al. | |
| 2009/0247441 A1 | 10/2009 | Baum | |
| 2009/0318640 A1 | 12/2009 | Brant et al. | |
| 2009/0318644 A1 | 12/2009 | Brant et al. | |
| 2009/0318646 A1 | 12/2009 | Brant et al. | |
| 2009/0318647 A1 | 12/2009 | Hagadorn et al. | |
| 2010/0069573 A1* | 3/2010 | Arriola et al. | 525/209 |
| 2010/0152388 A1 | 6/2010 | Jiang et al. | |
| 2010/0170829 A1 | 7/2010 | Ng et al. | |

FOREIGN PATENT DOCUMENTS

| | | |
|---|---|---|
| EP | 0 802 216 | 10/1997 |
| EP | 0 958 309 | 11/1999 |
| EP | 1 361 232 | 11/2003 |
| EP | 1 849 757 | 10/2007 |
| EP | 1 862 491 | 12/2007 |
| GB | 1 310 847 | 3/1973 |
| JP | 02-064115 | 3/1990 |
| JP | 1993/320260 | 3/1993 |
| JP | 2000/038420 | 2/2000 |
| JP | 2005/139284 | 6/2005 |
| JP | 2005-336092 | 12/2005 |
| JP | 2007/169340 | 7/2007 |
| JP | 2007/246433 | 9/2007 |
| JP | 2008/050278 | 3/2008 |
| JP | 2009-299046 | 12/2009 |
| JP | 2010/037555 | 2/2010 |
| JP | 2010-202628 | 9/2010 |
| JP | 2011/026448 | 2/2011 |
| JP | 2012/051859 | 3/2012 |
| JP | 2012/052062 | 3/2012 |
| WO | WO 95/27717 | 10/1995 |
| WO | WO 97/47665 | 12/1997 |
| WO | WO 99/05182 | 2/1999 |
| WO | WO 99/46270 | 9/1999 |
| WO | WO 00/00576 | 1/2000 |
| WO | WO 00/55218 | 9/2000 |
| WO | WO 03/040095 | 5/2003 |
| WO | WO 03/040233 | 5/2003 |
| WO | WO 03/040442 | 5/2003 |
| WO | WO 2004/031250 | 4/2004 |
| WO | WO 2004/046214 | 6/2004 |
| WO | WO 2005/090425 | 9/2005 |
| WO | WO 2005/090426 | 9/2005 |
| WO | WO 2005/090427 | 9/2005 |
| WO | WO 2005/092935 | 10/2005 |
| WO | WO 2006/127483 | 11/2006 |
| WO | WO 2007/003238 | 1/2007 |
| WO | WO 2008/027268 | 3/2008 |
| WO | WO 2008/080081 | 7/2008 |
| WO | WO 2008/141941 | 11/2008 |
| WO | WO 2009/009158 | 1/2009 |
| WO | WO 2009/155517 | 12/2009 |
| WO | WO 2010/037059 | 4/2010 |

OTHER PUBLICATIONS

Britovsek et al., *Iron and Cobalt Ethylene Polymerization Catalysts Bearing 2,6-Bis(Imino)Pyridyl Ligands: Synthesis, Structures, and Polymerization Studies*, Journal of the American Chemical Society, 1999, vol. 121, No. 38, pp. 8728-8740.

Chen et al., *Preparation of Epoxy-modified Polyethylene by Graft Extrusion and its Applications to Polyphenylene Sulfide Alloys as a Compatibilizer*, Reactive & Functional Polymers, 2008, vol. 68, No. 9, pp. 1307-1313.

Cossy et al., "*Cross-Metathesis reaction. Generation of Highly Functionalized Olefins from Unsaturated Alcohols*", Journal of Organometallic Chemistry, 2001, vol. 634, Issue 2, pp. 216-221.

Hansell et al., *Additive-Free Clicking for Polymer Functionalization and Coupling by Tetrazine-Norbornene Chemistry*, Journal of the American Chemical Society, 2011, vol. 133, No. 35, pp. 13828-13831.

Liu et al., *Kinetics of Initiation, Propagation, and Termination for the [rac-($C2H4$(1-indenyl)2)ZrMe]{MeB($C6F5$)3}-Catalyzed Polymerization of 1-Hexene*, Journal of the American Chemical Society, 2001, vol. 123, pp. 11193-111207.

Nagai et al., *Novel Well-defined Funcationalized Polyolefins and Polyolefin-polar Polymer Block Copolymers: Formations and Their Features*, Poly Preprints, 2008, vol. 49, No. 2, 776-777.

Nakatsuka et al., *Creation and Application of New Materials by a Fusion of FI-catalyst Technology and Fine Organic Synthesis Technology*, Shokubai, 2010, vol. 52, No. 8, pp. 569-574.

Rodriguez et al., *Poly(4-vinylpyridazine). First Synthesis, Characterization and Properties*, Polymeric Materials Science and Engineering, Proceedings of the ACS Division of Polymeric Materials Science and Engineering, 1990, vol. 63, pp. 376-382 (Abstract).

Shiono et al., *Copolymerization of poly(propylene) macromonomer with ethylene by (tert-butanamide)dimethyl(tetramethyl-qscyclopentadienyl) silane titanium dichloride/methylaluminoxane catalyst*, Macromol. Chem. Phys., 1997, vol. 198, pp. 3229-3237.

Weng et al., *Synthesis of Long-Chain Branched Propylene Polymers via Macromonomer Incorporation*, Macromol. Rapid Commun., 2001, vol. 22, No. 18, pp. 1488-1492.

Xu et al., *Ethylene Copolymerization with 1-Octene Using a 2-Methylbenz[e]indenyl-Based ansa-Monocyclopentadienylamido Complex and Methylaluminoxane Catalyst*, Macromolecules, 1998, vol. 31, pp. 4724-4729.

Amin et al., "*Versatile Pathways for In Situ Polyolefin Functionalization with Heteroatoms: Catalytic Chain Transfer*", Angewandte Chemie International Edition, 2008, vol. 47, pp. 2006-2025.

Ayinla et al., "Chiral Tantalum and Zironium Biphenyl Amidate Complexes: New Catalysts for the Assymetric Synthesis of Amines", Abstracts of Papers, 238th ACS National Meeting, Washington DC, United States, Aug. 16-20, 2009, INOR-252.

Babu et al., "*Microstructure of Poly(1-hexene) Produced by ansa-Zirconocenium Catalysis*", Macromolecules, 1994, vol. 27, pp. 3383-3388.

Baldwin et al., "*Cationic Alkylaluminum-Complexed Zirconocene Hydrides as Participants in Olefin Polymerization Catalysis*", JACS, 2010, vol. 132, pp. 13969-13971.

Bhriain et al., "*Polymeryl-Exchange Between Ansa-Zirconocene Catalysts for Norbornene-Ethene Copolymerization and Aluminum or Zinc Alkyls*", Macromolecules, 2005, vol. 38, pp. 2056-2063.

Bielawski et al., "*Synthesis of ABA Triblock Copolymers Via a Tandem Ring-Opening Metathesis Polymerization: Atom Transfer Radical Polymerization Approach*", Macromolecules, 2000, vol. 33, pp. 678-680.

Brant et al., "*Effect of Tacticity on the Dilute Solution Coil Dimensions of Poly(a-olefin)s*", Macromolecules, 2005, vol. 38, pp. 7178-7183.

(56) References Cited

OTHER PUBLICATIONS

Cherian et al., "Synthesis of Allyl-Terminated Syndiotactic Polypropylene: Macromonomers for the Synthesis of Branched Polyolefins", Macromolecules, 2005, vol. 38, pp. 6259-6268.

Chung, "Synthesis of Functional Polyolefin Copolymers with Graft and Block Structures", Progress in Polymer Science, 2002, vol. 27, pp. 39-85.

Clerici et al., "Catalytic C-Alkylation of Secondary Amines With Alkenes", Synthesis, 1980, vol. 4, pp. 305-306.

Corey et al., "Reactions of Hydrosilanes and Olefins in the Presence of $Cp_2MCl_2/nBuLi$", Organometallics, 1992, vol. 11, pp. 672-683.

Crowther et al., "Group 4 Metal Dicarbollide Chemistry. Synthesis, Structure, and Reactivity of Electrophilie Alkyl Complexes $(Cp^*)(C2B9H_{11})M(R)$ ($M = Hf, Zr$)", JACS, 1991, vol. 113, pp. 1455-1457.

Eisenberger et al., "Tantalum-amidate Complexes for the Hydroaminoalkylation of Secondary Amines: Enhanced Substrate Scope and Enantioselective Chiral Amine Synthesis", Angewandte Chemie International Edition, 2009, vol. 48, pp. 8361-8365.

Eshuis et al., "Catalytic Olefin Oligomerization and Polymerization with Cationic Group IV Metal Complexes $[Cp^*_2Mme(THT)]^+$ $[BPh_4]^-$, $M=Ti, Zr$ and $Hf$", Journal of Molecular Catalysis, 1990, vol. 62, pp. 277-287.

Frauenrath et al., "Polymerization of 1-Hexene Catalyzed by Bis(Cyclopentadienyl)Zirconium Dichloride/Methylaluminoxane; Effect of Temperature on the Molecular Weight and the Microstructure of Poly(1-Hexene)", Macromol. Rapid Commun., 1998, vol. 19, pp. 391-395.

Furuyama et al., "New High-Performance Catalysts Developed at Mitsui Chemicals for Polyolefins and Organic Synthesis", Catalysis Surveys from Asia, 2004, vol. 8, No. 1, pp. 61-71.

Galeotti et al., "Self-Functionalizing Polymer Film Surfaces Assisted by Specific Polystyrene End-Tagging",Chem. Mater., 2010, vol. 22, pp. 2764-2769.

Harney et al., "End-Group-Confined Chain Walking Within A Group 4 Living Polyolefin and Well-Defined Cationic Zirconium Alkyl Complexes for Modeling This Behavior", JACS, 2004, vol. 126, pp. 4536-4537.

Herzon et al., "Direct, Catalytic Hydroaminoalkylation of Unactivated Olefins with N-Alkyl Arylamines", JACS, 2007, vol. 129, pp. 6690-6691.

Herzon et al., "Hydroaminoalkylation of Unactivated Olefins with Dialkylamines", JACS, 2007, vol. 130, pp. 14940-14941.

Janiak et al., "Analyses of Propene and 1-Hexene Oligomers from Zirconium/MAO Catalysts—Mechanistic Implications by NMR, SEC, and MALDI-TOF MS", Macromol. Chem. Phys., 2002, vol. 203, pp. 129-138.

Janiak et al., "Metallocene Catalysts for Olefin Oligomerization", Macromol. Symp., 2006, vol. 236, pp. 14-22.

Janiak et al., "Metallocene and Related Catalysts for Olefin, Alkyne and Silane Dimerization and Oligomerization", Coordination Chemistry Reviews, 2006, vol. 250, pp. 66-94.

Jiang et al., "Highly Z-Selective Metathesis Homocoupling of Terminal Olefins", JACS, 2009, vol. 131, pp. 16630-16631.

Jones et al., "Synthesis and Reactive Blending of Amine and Anhydride End-Functional Polyolefins", Polymer, 2004, vol. 45, pp. 4189-4201.

Kaneyoshi et al., "Synthesis of Block and Graft Copolymers with Linear Polyethylene Segments by Combination of Degenerative Transfer Coordination Polymerization and Atom Transfer Radical Polymerization", Macromolecules, 2005, vol. 38, pp. 5425-5435.

Kesti et al., "Group 4 Metallocene Olefin Hydrosilyation Catalysts", Organometallics, 1992, vol. 11, pp. 1095-1103.

Kissin et al., "Post-Oligomerization of α-Olefin Oligomers: A Route to Single-Component and Multipcomponent Synthetic Lubricating Oils", Journal of Applied Polymer Science, 2009, vol. 111, pp. 273-280.

Kobayashi, "Routes to Functionalized Polyolefins", The Dow Chemical Company.

Kolodka et al., "Copolymerization of Propylene with Poly(Ethylene-Co-Propylene) Macromonomer and Branch Chain-Length Dependence of Rheological Properties", Macromolecules, 2002, vol. 35, pp. 10062-10070.

Kolodka et al., "Synthesis and Characterization of Long-Chain-Branched Polyolefins with Metallocene Catalysts: Copolymerization of Ethylene with Poly(Ethylene-Co-Propylene) Macromonomer", Macromol. Rapid Commun., 2003, vol. 24, pp. 311-315.

Koo et al., "Efficient New Routes to Functionalized Polyolefins", ChemTech. 1999, pp. 13-19.

Kostalik et al., "Solvent Processable Tetraalkylammonium-Functionalized Polyethylene for Use as an Alkaline Anion Exchange Membrane", Macromolecules, 2010, vol. 43, pp. 7147-7150.

Kubiak et al., "Titanium-Catalyzed Hydroaminoalkylation of Alkenes by C—H Bond Activation at SP3 Centers in the Alpha-Position to a Nitrogen Atom", Angewandte Chemie International Edition, 2009, vol. 48, No. 6, pp. 1153-1156.

Langston et al., "One-Pot Synthesis of Long Chain Branch PP (LCBPP) Using Ziegler-Natta Catalyst and Branching Reagents", Macromol. Symp., 2007, vol. 260, pp. 34-41.

Lehmus et al., "Chain End Isomerization as a Side Reaction in Metallocene-Catalyzed Ethylene and Propylene Polymerizations", Macromolecules, 2000, vol. 33, pp. 8534-8540.

Lopez et al., "Synthesis of Well-Defined Polymer Architectures by Successive Catalytic Olefin Polymerization and Living/Controlled Polymerization Reactions", Progress in Polymer Science, 2007, vol. 32, pp. 419-454.

Lu et al., "Reactivity of Common Functional Groups with Urethanes: Models for Reactive Compatibilization of Thermoplastic Polyurethane Blends", Journal of Polymer Science: Part A: Polymer Chemistry, 2002, vol. 40, pp. 2310-2328.

Markel et al., "Metallocene-Based-Branch—Block Thermoplastic Elastomers", Macromolecules, 2000, vol. 33, pp. 8541-8548.

Mathers et al., "Cross Metathesis Functionalization of Polyolefins", Chem. Commun., 2004, pp. 422-423.

Moscardi et al., "Propene Polymerization with the Isospecific, Highly Regioselective $rac$-$Me_2C(3$-$t$-$Bu$-$1$-$Ind)_2ZrCl_2$/MAO Catalyst. 2. Combined DFT/MM Analysis of Chain Propagation and Chain Release Reactions", Organometallics, 2001, vol. 20, pp. 1918-1931.

Negishi et al., "Reaction of Zirconocene Dichloride with Alkyllithiums or Alkyl Grignard Reagents as a Convenient Method for Generating a "Zirconocene" Equivalent and its Use in Zirconium-Promoted Cyclization of Alkenes, Alkynes, Dienes, Enynes, and Diynes[1]", Tetrahedron Letters, 1986, vol. 27, No. 25, pp. 2829-2832.

Nilsson et al., "Structural Effects on Thermal Properties and Morphology in XLPE", European Polymer Journal, 2010, vol. 46, pp. 1759-1769.

Ornealis et al., "Cross Olefin Metathesis for the Selective Functionalization, Ferrocenylation, and Solubilization in Water of Olefin-Terminated Dendrimers, Polymers, and Gold Nanoparticles and for a Divergent Dendrimer Construction", JACS, 2008, vol. 130, pp. 1495-1506.

Ornealis et al., "Efficient Mono- and Bifunctionalization of Polyolefin Dendrimers by Olefin Metathesis", Angewandte Chemie International Edition, 2005, vol. 44, pp. 7399-7404.

Parks et al., "Studies on the Mechanism of $B(C_6F_5)_3$-Catalyzed Hydrosilation of Carbonyl Functions", J. Org. Chem., 2000, vol. 65, pp. 3090-3098.

Prochnow et al., "Tetrabenzyltitanium: An Improved Catalyst for the Activation of SP3 C—H Bonds Adjacent to Nitrogen Atoms", ChemCatChem, 2009, vol. 1, No. 1, pp. 162-172.

Resconi et al., "Chain Transfer Reactions in Propylene Polymerization with Zirconocene Catalysts", Topics in Catalysis, 1999, vol. 7, pp. 145-163.

Resconi et al., "Olefin Polymerization at Bis(pentamethylcyclopentadienyl)zirconium and -hafnium Centers: Chain-Transfer Mechanisms", JACS, 1992, vol. 114, pp. 1025-1032.

Reznichenko et al., "Group 5 Metal Binaptholate Complexes for Catalytic Asymmetric Hydroaminoalkylation and Hydroamination/Cyclization", Organometallics, 2011, vol. 30, pp. 921-924.

Roesky, "Catalytic Hydroaminoalkylation", Angewandte Chemie International Edition, 2009, vol. 48, pp. 4892-4894.

(56) References Cited

OTHER PUBLICATIONS

Rose et al., "Poly(Ethylene-Co-Propylene Macromonomer)s: Synthesis and Evidence for Starlike Conformations in Dilute Solution", Macromolecules, 2008, vol. 41, pp. 559-567.

Rossi et al., "End Groups in 1-Butene Polymerization Via Methylaluminoxane and Zirconocene Catalyst", Macromolecules, 1995, vol. 28, pp. 1739-1749.

Rulhoff et al., "Synthesis and Characterization of Defined Branched Poly(propylene)s with Different Microstructures by Copolymerization of Propylene and Linear Ethylene Oligomers ($C_n$=26-28) with Metallocenes/MAO Catalysts", Macromolecules, 2006, vol. 16, pp. 1450-1460.

Scherman et al., "Synthesis and Characterization of Stereoregular Ethylene-Vinyl Alcohol Copolymers Made by Ring-Opening Metathesis Polymerization", Macromolecules, 2005, vol. 38, pp. 9009-9014.

Seayed et al., "Hydroaminomethylation of Olefins Using a Rhodium Carbene Catalyst", Tetrahedron Letters, 2003, vol. 44, No. 8, pp. 1679-1683.

Segawa et al., "Catalytic Hydroaminoalkylation of Alkene", Yuki Gosei Kagaku Kyokaishi, 2009, vol. 67, No. 8, pp. 834-844. (Abstract only).

Shiono et al., "Additive Effects of Trialkylaluminum on Propene Polymerization with ($t$-BuNSiMe$_2$Flu)TiMe$_2$-Based Catalysts", Applied Catalysis A: General, 2000, vol. 200, pp. 145-152.

Shiono et al., "Copolymerization of Atactic Polypropene Macromonomer with Propene by an Isospecific Metallocene Catalyst", Macromolecules, 1999, vol. 32, pp. 5723-5727.

Sill et al., "Bis-Dendritic Polyethylene Prepared by Ring-Opening Metathesis Polymerization in the Presence of Bis-Dendritic Chain Transfer Agents", Journal of Polymer Science: Part A: Polymer Chemistry, 2005, vol. 43, pp. 5429-5439.

Small et al., "Polymerization of Propylene by a New Generation of Iron Catalysts: Mechanisms of Chain Initiation, Propagation, and Termination", Macromolecules, 1999, vol. 32, pp. 2120-2130.

Stadler et al., "Long-Chain Branches in Syndiotactic Polypropene Induced by Vinyl Chloride", Macromolecular Chemistry and Physics, 2010, vol. 211, pp. 1472-1481.

Sun et al., "Effect of Short Chain Branching on the Coil Dimensions of Polyolefins in Dilute Solution", Macromolecules, 2001, vol. 34, pp. 6812-6820.

Sunderhaus et al., "Oxidation of Carbon-Silicon Bonds: The Dramatic Advantage of Strained Siletanes", Organic Letters, 2003, vol. 5, No. 24, pp. 4571-4573.

Switek et al., "ABA Triblock Copolymers with a Ring-Opening Metathesis Polymerization/Macromolecular Chain-Transfer Agent Approach", Journal of Polymer Science: Part A: Polymer Chemistry, 2007, vol. 45, pp. 361-373.

Thomas et al., "Synthesis of Telechelic Polyisoprene via Ring-Opening Metathesis Polymerization in the Presence of Chain Transfer Agent", Macromolecules, 2010, vol. 43, pp. 3705-3709.

Wei et al., "Aufbaureaktion Redux: Scalable Production of Precision Hydrocarbons from $AlR_3$ ($R$=Et or iBu) by Dialkyl Zinc Mediated Ternary Living Coordinative Chain-Transfer Polymerization", Angewandte Chemie Inernational Edition, 2010, vol. 49, pp. 1768-1772.

Weng et al., "Long Chain Branched Isotactic Polypropylene", Macromolecules, 2002, vol. 35, pp. 3838-3843.

Weng et al., "Synthesis of Vinly-Terminated Isotactic Poly(Propylene)", Macromol. Rapid Commun., 2000, vol. 21, pp. 1103-1107.

Yang et al., "Catatonic Metallocene Polymerization Catalysts, Synthesis and Properties of the First Base-Free Zirconocene Hydride", Angewandte Chemie International Edition Engl., 1992, vol. 31, pp. 1375-1377.

Yin et al., "Scope and Mechanism of Allylic C-H Amination of Terminal Alkenes by the Palladium/PhL(OPiv)$_2$ Catalyst System: Insights into the Effect of Naphthoquinone", JACS, 2010, vol. 132, pp. 11978-11987.

Zhang et al., "Functionalization of Polyolefins Through Catalytic Hydrosilylation and Imidation Reactions", ANTEC, 2005, pp. 2686-2690.

Balboni et al., $C_2$-Symmetric Zirconocenes for High Molecular Weight Amorphous Poly(propylene), Macromolecular Chemistry and Physics, 2001, vol. 202, No. 10, pp. 2010-2028.

Brzezinska et al., "Synthesis of ABA Triblock Copolymers via Acyclic Diene Metathesis Polymerization and Living Polymerization of a-Amino Acid-N-Carboxyanhydrides", Macromolecules, 2001, vol. 34, pp. 4348-4354.

Bujadoux et al., Use of Bridged and Non-bridged Metallocene Catalysts in High Pressure/High Temperature Ethylene/α-olefin Copolymerization, Metallocene Polymers, 1995, pp. 377-402.

Koo et al., "Silicon-Modified Ziegler-Natta Polymerization. Catalytic Approaches to Silyl-Capped and Silyl-Linked Polyolefins Using "Single-Site" Cationic Ziegler-Natta Catalysts", JACS, 1999, vol. 121, pp. 8791-8802.

Passaglia et al., "Grafting of Diethyl Maleate and Maleic Anhydride Onto Styrene-b-(Ethylene-co-1-Butene)-b-Styrene Triblock Copolymer (SEBS)", Polymer, 2000, vol. 41, pp. 4389-4400.

Quirk et al., "Anionic Synthesis of Secondary Amine Functionalized Polymers by Reaction of Polymeric Organolithiums with N-Benzylidenemethylamine", Macromolecular Chemistry and Physics, 2002, vol. 203, pp. 1178-1187.

Rybak et al., "Acyclic Diene Metathesis with a Monomer with a Monomer from Renewable Resources: Control of Molecular Weight and One-Step Preparation of Block Copolymers", ChemSusChem, 2008, vol. 1, pp. 542-547.

* cited by examiner

AMPHIPHILIC BLOCK POLYMERS PREPARED BY ALKENE METATHESIS

RELATED APPLICATIONS

This application is related to U.S. Ser. No. 12/143,663, filed on Jun. 20, 2008 (Published as WO 2009/155471); U.S. Ser. No. 12/487,739, filed on Jun. 19, 2009 (Published as WO 2009/155472); U.S. Ser. No. 12/488,066, filed on Jun. 19, 2009 (Published as WO 2009/155510); 12/488,093 filed on Jun. 19, 2009 (Published as WO 2009/155517); and U.S. Ser. No. 12/642,453, filed Dec. 18, 2009; which is a continuation-in-part application of U.S. Ser. No. 12/533,465 filed on Jul. 31, 2009, which claims priority to and the benefit of U.S. Ser. No. 61/136,172, filed on Aug. 15, 2008; which are all incorporated by reference herein.

This invention also relates to the following concurrently filed applications:

a) U.S. Ser. No. 13/072,280, filed Mar. 25, 2011, entitled "Novel Catalysts and Methods of Use Thereof to Produce Vinyl Terminated Polymers";

b) U.S. Ser. No. 13/072,189, filed Mar. 25, 2011, entitled "Amine Functionalized Polyolefin and Methods for Preparation Thereof";

c) U.S. Ser. No. 13/072,279, filed Mar. 25, 2011, entitled "Enhanced Catalyst Performance for Production of Vinyl Terminated Propylene and Ethylene/Propylene Macromers";

d) U.S. Ser. No. 13/072,383, filed Mar. 25, 2011, entitled "Diblock Copolymers Prepared by Cross Metathesis";

e) U.S. Ser. No. 13/072,288, filed Mar. 25, 2011, entitled "Vinyl Terminated Higher Olefin Polymers and Methods to Produce Thereof";

f) U.S. Ser. No. 13/072,305, filed Mar. 25, 2011, entitled "Hydrosilylation of Vinyl Macromers with Metallocenes";

g) U.S. Ser. No. 13/072,432, filed Mar. 25, 2011, entitled "Olefin Triblock Polymers via Ring-Opening Metathesis Polymerization";

h) U.S. Ser. No. 13/072,330, filed Mar. 25, 2011, entitled "Block Copolymers from Silylated Vinyl Terminated Macromers";

i) U.S. Ser. No. 13/072,249, filed Mar. 25, 2011, entitled "Vinyl Terminated Higher Olefin Copolymers and Methods to Produce Thereof"; and j) U.S. Ser. No. 61/467,681, filed Mar. 25, 2011, entitled "Branched Vinyl Terminated Polymers and Methods for Production Thereof".

FIELD OF THE INVENTION

This invention relates to ester functionalization of vinyl terminated polyolefins by metathesis reactions.

BACKGROUND OF THE INVENTION

Metathesis is generally thought of as the interchange of radicals between two compounds during a chemical reaction. There are several varieties of metathesis reactions, such as ring opening metathesis, acyclic diene metathesis, ring closing metathesis, and cross metathesis. These reactions, however, have had limited success with the metathesis of functionalized olefins.

Methods for the production of polyolefins with end-functionalized groups are typically multi-step processes that often create unwanted by-products and waste of reactants and energy.

R. T. Mathers and G. W. Coates, *Chem. Commun.*, 2004, pp. 422-423 disclose examples of using cross-metathesis to functionalize polyolefins containing pendant vinyl groups to form polar-functionalized products with a graft-type structure.

D. Astruc et al., *J. Am. Chem. Soc.*, 2008, 130, pp. 1495-1506 and D. Astruc et al., *Angew. Chem. Int. Ed.*, 2005, 44, pp. 7399-7404 disclose examples of using cross metathesis to functionalize non-polymeric molecules containing vinyl groups.

For reviews of methods to form end-functionalized multi-block polyolefins, see: (a) S. B. Amin and T. J. Marks, *Angew. Chem. Int. Ed.*, 2008, 47, pp. 2006-2025; (b) T. C. Chung, *Prog. Polym. Sci.*, 2002, 27, pp. 39-85; and (c) R. G. Lopez, F. D'Agosto, and C. Boisson, *Prog. Polym. Sci.*, 2007, 32, pp. 419-454.

U.S. Ser. No. 12/487,739, filed Jun. 19, 2009 discloses certain vinyl terminated oligomers and polymers that are functionalized for use in lubricant applications.

U.S. Ser. No. 12/143,663, filed on Jun. 20, 2008 discloses certain vinyl terminated oligomers and polymers that are functionalized in U.S. Ser. No. 12/487,739, filed Jun. 19, 2009.

Additional references of interest include U.S. Pat. No. 4,988,764.

Thus, there is a need to develop a means to provide functionalized multiblock polyolefins (particularly end-functionalized) by metathesis reactions, particularly reactions with good conversion, preferably under mild reaction conditions in a minimal number of steps. There is also a need for a single reaction type that allows for a variety of functional groups to be added to polyolefins in an economical manner.

End-functionalized multiblock polyolefins that feature a chemically reactive or polar end group are of interest for use in a broad range of applications, such as compatibilizers, tie-layer modifiers, surfactants, and surface modifiers.

The instant invention's use of olefin alkene metathesis to introduce functional groups is both a commercially economical and an "atom-economical" route to end functionalized multiblock polyolefins. This invention further provides vinyl-terminated polyolefins that react with functionalized alkenes in the presence of a metathesis catalyst to form polar end-functionalized multiblock polyolefins. Herein is described a novel method for polar end functionalized multiblock polyolefin production by the metathesis of vinyl-terminated polyolefins with ester functionalized alkenes. This method is useful in a range of polyolefins, including isotactic polypropylene (iPP), atactic polypropylene (aPP), ethylene propylene copolymer (EP), and polyethylene (PE).

SUMMARY OF THE INVENTION

This invention relates to a process to functionalize polyolefins (as used herein, polyolefin is defined to include both polymers and oligomers) comprising contacting an alkene metathesis catalyst with an acrylate or methacrylate functionalized polyalkylene glycol and one or more vinyl terminated polyolefins.

Preferably the vinyl terminated polyolefin comprise one or more of:

a) a propylene co-oligomer having an Mn of 300 to 30,000 g/mol (as measured by $^1$H NMR) comprising 10 to 90 mol % propylene and 10 to 90 mol % of ethylene, wherein the oligomer has at least X % allyl chain ends (relative to total unsaturations), where: 1) X=(−0.94 (mol % ethylene incorporated)+100), when 10 to 60 mol % ethylene is present in the co-oligomer; 2) X=45, when greater than 60 and less than 70 mol % ethylene is present in the co-oligomer; and 3)

X=(1.83*(mol % ethylene incorporated)−83), when 70 to 90 mol % ethylene is present in the co-oligomer; and/or b) a propylene oligomer, comprising more than 90 mol % propylene and less than 10 mol % ethylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.35:1.0 and less than 1400 ppm aluminum; and/or c) a propylene oligomer, comprising at least 50 mol % propylene and from 10 to 50 mol % ethylene, wherein the oligomer has: at least 90% allyl chain ends, Mn of about 150 to about 10,000 g/mol (as measured by $^1$H NMR), and an isobutyl chain end to allylic vinyl group ratio of 0.8:1 to 1.3:1.0, wherein monomers having four or more carbon atoms are present at from 0 to 3 mol %; and/or d) a propylene oligomer, comprising at least 50 mol % propylene, from 0.1 to 45 mol % ethylene, and from 0.1 to 5 mol % $C_4$ to $C_{12}$ olefin, wherein the oligomer has: at least 87% allyl chain ends (alternately at least 90%), an Mn of about 150 to about 10,000 g/mol, (as measured by $^1$H NMR), and an isobutyl chain end to allylic vinyl group ratio of 0.8:1 to 1.35:1.0; and/or e) a propylene oligomer, comprising at least 50 mol % propylene, from 0.1 to 45 mol % ethylene, and from 0.1 to 5 mol % diene, wherein the oligomer has: at least 90% allyl chain ends, an Mn of about 150 to about 10,000 g/mol (as measured by $^1$H NMR), and an isobutyl chain end to allylic vinyl group ratio of 0.7:1 to 1.35:1.0; and/or f) a homooligomer, comprising propylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.2:1.0, and less than 1400 ppm aluminum; and/or g) a branched polyolefin having an Mn ($^1$H NMR) of 7,500 to 60,000 g/mol comprising: (i) one or more alpha olefin derived units comprising ethylene and propylene; (ii) 50% or greater allyl chain ends, relative to total number of unsaturated chain ends; and (iii) a g'(vis) of 0.90 or less; and/or h) branched polyolefins having an Mn greater than 60,000 g/mol comprising: (i) one or more alpha olefins comprising ethylene and propylene; (ii) 50% or greater allyl chain ends, relative to total unsaturated chain ends; (iii) a g'(vis) of 0.90 or less; and (iv) a bromine number which, upon complete hydrogenation, decreases by at least 50%; and/or i) a branched polyolefins having an Mn of less than 7,500 g/mol comprising: (i) one or more alpha olefin derived units comprising ethylene and propylene; (ii) a ratio of percentage of saturated chain ends to percentage of allyl chain ends of 1.2 to 2.0; and (iii) 50% or greater allyl chain ends, relative to total moles of unsaturated chain ends; and/or j) vinyl terminated higher olefin copolymers having an Mn (measured by $^1$H NMR) of 300 g/mol or greater (preferably 300 to 60,000 g/mol) comprising: (i) from about 20 to 99.9 mol % of at least one $C_5$ to $C_{40}$ higher olefin; and (ii) from about 0.1 to 80 mol % of propylene; wherein the higher olefin copolymer has at least 40% allyl chain ends; and/or k) vinyl terminated higher olefin copolymers having an Mn (measured by $^1$H NMR) of 300 g/mol or greater (preferably 300 to 60,000 g/mol) comprising: (i) from about 80 to 99.9 mol % of at least one $C_4$ olefin; and (ii) from about 0.1 to 20 mol % of propylene, wherein the higher olefin copolymer has at least 40% allyl chain ends; and/or l) a higher olefin polymer having an Mn (measured by $^1$H NMR) of at least 200 g/mol comprising of one or more $C_4$ to $C_{40}$ higher olefin derived units, where the higher olefin vinyl terminated polymer comprises substantially no propylene derived units; and wherein the higher olefin polymer has at least 5% allyl chain ends.

DETAILED DESCRIPTION

The term "polyolefin" as used herein means an oligomer or polymer of two or more olefin mer units and specifically includes oligomers and polymers as defined below. An "olefin," alternatively referred to as "alkene," is a linear, branched, or cyclic compound of carbon and hydrogen having at least one double bond. Ethylene shall be considered an alpha-olefin.

A propylene polymer or oligomer contains at least 50 mol % of propylene, an ethylene polymer or oligomer contains at least 50 mol % of ethylene, and so on.

For purposes of this specification and the claims appended thereto, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less).

As used herein, Mn is number average molecular weight (measured by $^1$H NMR unless stated otherwise), Mw is weight average molecular weight (measured by Gel Permeation Chromatography), and Mz is z average molecular weight (measured by Gel Permeation Chromatography), wt % is weight percent, and mol % is mole percent. Molecular weight distribution (MWD) is defined to be Mw (measured by Gel Permeation Chromatography) divided by Mn (measured by $^1$H NMR). Unless otherwise noted, all molecular weight units (e.g., Mw, Mn, Mz) are g/mol.

"Allyl chain ends" (also referred to as "vinyl termination", "vinyl chain ends" "allylic vinyl end group" or "vinyl content") is defined to be a polyolefin (oligomer or polymer) having at least one terminus represented by formula I:

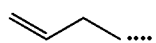

allylic vinyl end group where the "..." represents the polyolefin chain. In a preferred embodiment, the allyl chain end is represented by the formula II:

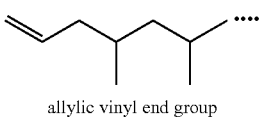

allylic vinyl end group

The amount of allyl chain ends is determined using $^1$H NMR at 120° C. using deuterated tetrachloroethane as the solvent on a 500 MHz machine and, in selected cases, confirmed by $^{13}$C NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene oligomers in J American Chemical Soc., 114, 1992, pp. 1025-1032 that are useful herein.

"Isobutyl chain end", also referred to as an "isobutyl end group," is defined to be a polyolefin (oligomer or polymer) having at least one terminus represented by the formula:

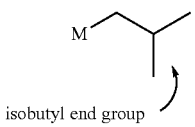

isobutyl end group where M represents the polyolefin (oligomer or polymer) chain. In a preferred embodiment, the isobutyl chain end is represented by one of the following formulae:

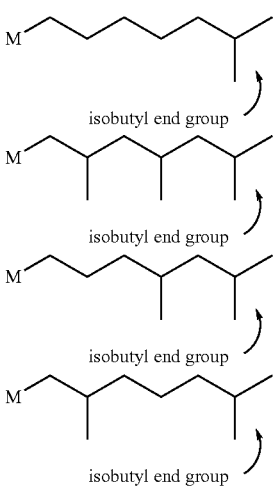

isobutyl end group isobutyl end group isobutyl end group isobutyl end group where M represents the polyolefin chain.

The percentage of isobutyl end groups is determined using $^{13}$C NMR (as described in the example section) and the chemical shift assignments in Resconi et al., J. Am. Chem. Soc., 1992, 114, pp. 1025-1032 for 100% propylene oligomers (and polymers) and set forth in FIG. 2 of WO 2009/155471 for E-P oligomers (and polymers).

The "isobutyl chain end to allylic vinyl group ratio" is defined to be the ratio of the percentage of isobutyl chain ends to the percentage of allylic vinyl groups.

Unless otherwise indicated, the term "internal unsaturation" means a double bond that is not an allyl chain end as defined above, a vinylene, or vinylidene unsaturation.

The term "diblock" is defined to mean that there are two different segments in the multiblock polyolefin, e.g., the PO segment and the $(CR^{17}R^{18})_m$—O)$_n$ segment in Formula (X) are different, where the term "different" indicates that the mer units of the segments differ from each other by at least one atom, the mer units of the segments differ isomerically, the segments differ in Mn, Mw, Mz, tacticity, Mw/Mn, g'vis, vinyl, vinylidene, vinylene, or internal unsaturation content, amount of comonomer (when the comonomer is the same or different in the segments), density (ASTM D 1505), melting point, heat of fusion, Brookfield viscosity, specific gravity (ASTM D 4052), or any other fluid or polyolefin property described in US 2008/0045638, paragraphs [0593] to [0636] (in event of conflict between test procedures in the instant specification and US 2008/0045638, the instant specification shall control). The term "triblock" means is defined to mean that there are three different segments in the functionalized multiblock polyolefin, e.g., two PO segments and the $(CR^{17}R^{18})_m$—O)$_n$ segment in Formula (XX) where the PO segment is different from the $(CR^{17}R^{18})_m$—O)$_n$ segment and the two PO's may be the same or different, where the term "different" indicates that the mer units of the segments differ from each other by at least one atom, the mer units of the segments differ isomerically, the segments differ in Mn, Mw, Mz, tacticity, Mw/Mn, g'vis, vinyl, vinylidene, vinylene, or internal unsaturation content, amount of comonomer (when the comonomer is the same or different in the segments), density (ASTM D 1505), melting point, heat of fusion, Brookfield viscosity, specific gravity (ASTM D 4052), or any other fluid or polyolefin property described in US 2008/0045638, paragraphs [0593] to [0636] (in event of conflict between test procedures in the instant specification and US 2008/0045638, the instant specification shall control). The term "multiblock" is defined to mean at least two segments, a PO segment and a $(CR^{17}R^{18})_m$—O)$_n$) segment are present in the functionalized multiblock polyolefin and encompasses the terms "diblock" and "triblock". The term "vinyl terminated polyolefin" also referred to as "vinyl terminated macromer" or "VTM" is defined to be a polyolefin (oligomer or polymer) having at least 30% allyl chain ends (relative to total unsaturation), preferably having an Mn of at least 300 g/mol, preferably from 500 to 100,000 g/mol.

As used herein, the new notation for the Periodic Table Groups is used as described in Chemical and Engineering News, 63(5), pg. 27, (1985).

The term "substituted" means that a hydrogen group has been replaced with a hydrocarbyl group, a heteroatom or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise the terms "group" and "substituent" are also used interchangeably in this document. For purposes of this disclosure, "hydrocarbyl radical" is defined to be $C_1$-$C_{20}$ radicals, that may be linear, branched, or cyclic (aromatic or non-aromatic); and include substituted hydrocarbyl radicals as defined below.

Substituted hydrocarbyl radicals are radicals in which at least one hydrogen atom has been substituted with a heteroatom or heteroatom containing group, preferably with at least one functional group such as halogen (Cl, Br, I, F), NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one heteroatom has been inserted within the hydrocarbyl radical, such as halogen (Cl, Br, I, F), O, S, Se, Te, NR*, PR*, AsR*, SbR*, BR*, SiR*$_2$, GeR*$_2$, SnR*$_2$, PbR*$_2$, and the like, where R* is, independently, hydrogen or a hydrocarbyl.

A "substituted alkyl" or "substituted aryl" group is an alkyl or aryl radical made of carbon and hydrogen where at least one hydrogen is replaced by a heteroatom, a heteroatom containing group, or a linear, branched, or cyclic substituted or unsubstituted hydrocarbyl group having 1 to 30 carbon atoms.

By "reactive termini" is meant a polymer having a vinyl, vinylidene, vinylene, or other terminal group that can be polymerized into a growing polymer chain.

Bromine number is determined by ASTM D 1159.

ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr., and S. Wilson, Eds., Butterworth-Heinemann, Boston, Mass., 1992, pp. 633-644, is used to determine the amount of an element in a material.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, pMe is para-methyl, Ar* is 2,6-diisopropylaryl, Bz is benzyl, THF is tetrahydrofuran, RT is room temperature and tol is toluene.

This invention relates to a process to functionalize vinyl terminated polyolefin comprising contacting an alkene metathesis catalyst with an acrylate or methacrylate functionalized polyalkylene glycol, and one or more vinyl terminated polyolefins, preferably comprising one or more of the vinyl terminated polyolefins described herein. This invention also relates to the functionalized mutiblock polyolefins produced thereby.

Functionalized Multiblock Polyolefins

In one aspect, a functionalized multiblock polyolefin produced by this invention is represented by the formula (X) or (XX):

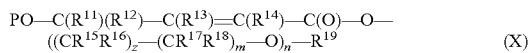

(X)

or

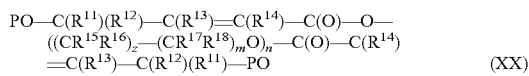

(XX)

wherein $R^{11}$, $R^{12}$, $R^{13}$, and $R^{14}$ are each, independently, a substituted or unsubstituted $C_1$ through $C_4$ hydrocarbyl group (preferably substituted or unsubstituted methyl, ethyl, propyl, butyl, and isomers thereof) or a hydrogen;
$R^{15}$, $R^{16}$, $R^{17}$, and $R^{18}$ are each independently a substituted or unsubstituted $C_1$ through $C_4$ hydrocarbyl group (preferably substituted or unsubstituted methyl, ethyl, propyl, butyl, and isomers thereof) or a hydrogen;
$R^{19}$ is a $C_1$ to a $C_{20}$ substituted or unsubstituted hydrocarbyl group (preferably substituted or unsubstituted methyl, ethyl, propyl, butyl, pentyl, hexyl, heptyl, octyl, nonyl, decyl, docecyl, and isomers thereof) or a hydrogen;
z is ≥1 to about 5, preferably 2, 3, 4, or 5;
m is ≥1 to about 5, preferably 2, 3, 4, or 5;
each PO is, independently, a polyolefin hydrocarbyl group comprising 10 to 4000 carbon atoms (preferably 15 to 3500, preferably 100 to 2500; and n is from 1 to about 10,000, preferably 2 to 1000, preferably 3 to 500, preferably 4 to 300, preferably 4 to 150, preferably 4 to 50, preferably 4 to 20.

In a preferred embodiment, in Formula (X) $R^{11}$, $R^{12}$, $R^{13}$, $R^{14}$, $R^{15}$, $R^{16}$, $R^{17}$, and $R^{18}$ are each hydrogen atoms and $R^{19}$ is a hydrogen, a methyl or an ethyl group. In preferred embodiment, in Formula (XX) $R^{11}$, $R^{12}$, $R^{13}$, $R^{14}$, $R^{15}$, $R^{16}$, $R^{17}$, and $R^{18}$ are hydrogen.

In a preferred embodiment, z is 1, m is 1, and n is from 2 to about 1000; alternately z is 2, m is 1, and n is from 2 to about 1000; alternately z is 2, m is 2, and n is from 2 to about 1000.

In a preferred embodiment, PO has at least 15 carbon atoms, preferably at least 100 carbon atoms.

In a preferred embodiment, $R^{11}$ through $R^{14}$ are all hydrogens and one of $R^{15}$ through $R^{18}$ is a $C_1$-$C_6$ hydrocarbon.

In another preferred embodiment, $R^{12}$ through $R^{18}$ comprise six hydrogens and one $C_1$-$C_6$ hydrocarbon.

In another preferred embodiment, $R^{12}$ through $R^{18}$ comprise six hydrogens and one methyl group.

In a preferred embodiment, the functionalized multiblock polyolefin is amphiphilic, e.g., n is greater than 1, preferably from 1 to 100, and PO is a hydrocarbyl or a substituted hydrocarbyl, provided that if PO is a substituted hydrocarbyl, then PO is not water soluble. Preferably, one of "($CR^{17}R^{18})_m$—O)$_n$" or PO in Formula (X) or (XX) is hydrophobic and the other is hydrophilic.

In another embodiment, the two PO groups in Formula (XX) are different. (For convenience, the two different PO groups in Formula (XX) can be referred to as PO and PO* in the following discussion). An example of two different PO groups would be having PO being isotactic PP and PO* being an EP copolymer, with the ethylene content in the PO* being from 5 wt % to 60 wt %, preferably about 50 wt %. A preferred embodiment for the functionalized multiblock polyolefin of Formula (XX) has PO and PO* being different, with PO being immiscible with PO*. By immiscible is meant that if the vinyl terminated polyolefins that become PO and PO* were blended together they would form a heterogeneous composition.

By homogeneous composition it is meant a composition having substantially one morphological phase. (A co-continuous morphology is considered a single state for purposes of this invention and the claims thereto.) For example, a blend of two polymers where one polymer is miscible with another polymer is said to be homogeneous in the solid state. Such morphology is determined using optical microscopy, scanning electron microscopy (SEM) or atomic force microscopy (AFM), in the event the optical microscopy, SEM and AFM provide different data, then the SEM data shall be used. By contrast, two separate phases would be observed for an immiscible blend. A miscible blend is homogeneous, while an immiscible blend is heterogeneous.

In a preferred embodiment, PO and PO*, and/or the vinyl terminated polyolefins PO and PO* are derived from, differ by at least 5% relative to each other, preferably by at least 10% different, preferably by at least 20% different, preferably by at least 30% different, preferably by at least 40%, preferably by at least 50% different, preferably by at least 60% different, preferably by at least 75%, preferably by at least 100% different, preferably by at least 150% different, preferably by at least 200% in Mn, Mw, Mz, tacticity, Mw/Mn, g'vis, vinyl, vinylidene, vinylene, or internal unsaturation content, amount of comonomer (when the comonomer is the same or different in the segments), density (ASTM D 1505), melting point, heat of fusion, Brookfield viscosity, specific gravity (ASTM D 4052), or any other fluid or polyolefin property described in US 2008/0045638, paragraphs [0593]

to [0636] (in event of conflict between test procedures in the instant specification and US 2008/0045638, the instant specification shall control). In another embodiment, PO and PO*, and/or the vinyl terminated polyolefins PO and PO* are derived from, differ by 5% to 1000%, relative to each other, preferably by 10% to 200%, preferably by 20% to 100%.

In a preferred embodiment, PO and PO*, and/or the vinyl terminated polyolefins PO and PO* are derived from, differ in comonomer content preferably by at least 5 mol %, relative to each other, preferably by at least 10 mol % different, preferably by at least 20 mol % different, preferably by at least 30 mol % different, preferably by at least 40 mol % (for example, an ethylene copolymer having 20 mol % propylene differs from a propylene copolymer having 5 mol % butene by 15 mol %). In a preferred embodiment, PO and PO*, and/or the vinyl terminated polyolefins PO and PO* are derived from, differ in Mn, Mw, Mz, Mw/Mn, g'vis, vinyl, vinylidene, vinylene, or internal unsaturation content, density (ASTM D-1505), melting point, heat of fusion, % tacticity, and/or crystallization point by at least 5% relative to each other, preferably by at least 10% different, preferably by at least 20% different, preferably by at least 30% different, preferably by at least 40% (for example, a polymer having an Mw of 500 g/mol differs from a polymer having an Mw of 732 by 46%). In a preferred embodiment, the Tm's, according to the DSC, of PO and PO*, and/or the vinyl terminated polyolefins PO and PO* are derived from, are different by at least 5° C., preferably by at least 10° C., preferably by at least 20° C., preferably by at least 30° C., preferably by at least 40° C., preferably by at least 50° C., preferably by at least 60° C., preferably by at least 70° C., preferably by at least 80° C. Likewise, in a preferred embodiment, the crystallization temperatures (Tc), according to the DSC, of PO and PO*, and/or the vinyl terminated polyolefins PO and PO* are derived from, are different by at least 5° C., preferably by at least 10° C., preferably by at least 20° C., preferably by at least 30° C., preferably by at least 40° C., preferably by at least 50° C., preferably by at least 60° C., preferably by at least 70° C., preferably by at least 80° C. Further, in a preferred embodiment, the heat of fusion (Hf), determined by DSC, of PO and PO*, and/or the vinyl terminated polyolefins PO and PO* are derived from, are at least 5 J/g different, preferably at least 10 J/g different, preferably at least 20 J/g different, preferably at least 50 J/g different, preferably at least 80 J/g different.

In a preferred embodiment, the functionalized multiblock polyolefin composition (i.e., the functionalized multiblock polyolefin and any unreacted starting materials, prior to fractionation or washing), has little or no reactive termini as shown by a ratio of 2.0 or greater (preferably 5 or greater, preferably 10 or greater, preferably 20 or greater) for the intensity of the internal unsaturation peaks at about 128 to 132 ppm to the reactive termini peaks at about 114 and 139 ppm in the $^{13}$C NMR spectrum.

In certain embodiments, the functionalized multiblock polymer of Formula (X) has an average of about 0.75 to about 1.25 internal unsaturation sites per polyolefin chain, as determined by $^1$H NMR of the polyolefin for functionalized multiblock polymers having an Mn of up to 60,000 g/mol as determined by $^1$H NMR.

In certain embodiments, the functionalized multiblock polymer of Formula (XX) has an average of about 1.50 to about 2.50 internal unsaturation sites per polyolefin chain, as determined by $^1$H NMR of the polyolefin for multiblock polymers having an Mn of up to 60,000 g/mol as determined by $^1$H NMR.

In a preferred embodiment, the various components of the functionalized multiblock polyolefin can be separated from each other using the preparative TREF procedure below. In a preferred embodiment, once the functionalized multiblock polyolefin has been fractionated, the fraction containing the largest mass is selected (and is presumed to be the multiblock polyolefin produced herein) and subjected to characterization, such as DSC (as described below). Preferably, the multiblock polyolefin (e.g., the selected fraction with the largest mass) shows at least two peak melting temperatures (Tm) according to the DSC (at least 3 Tm's if PO and PO* are different) and the Tm's are each different from the other by at least 5° C., preferably by at least 10° C., preferably by at least 20° C., preferably by at least 30° C., preferably by at least 40° C., preferably by at least 50° C., preferably by at least 60° C., preferably by at least 70° C., preferably by at least 80° C. Likewise, preferably the multiblock polyolefin (e.g., the selected fraction with the largest mass) shows at least two crystallization temperatures (Tc) according to the DSC (at least three Tc's if PO and PO* are different) and the Tc's are each different from the other by at least 5° C., preferably by at least 10° C., preferably by at least 20° C., preferably by at least 30° C., preferably by at least 40° C., preferably by at least 50° C., preferably by at least 60° C., preferably by at least 70° C., preferably by at least 80° C. Further in a preferred embodiment, the heat of fusion (Hf), determined by DSC, of the multiblock polyolefin (e.g., the selected fraction with the largest mass) is between the Hfs of the starting vinyl terminated polyolefins. Preferably, the Hf of the multiblock polyolefin (e.g., the selected fraction with the largest mass) is at least 5 J/g different than the Hf of the starting vinyl terminated polyolefin having the highest Hf, preferably at least 10 J/g different, preferably at least 20 J/g different, preferably at least 50 J/g different, preferably at least 80 J/g different. In a preferred embodiment, the Hf of the multiblock polyolefin (e.g., the selected fraction with the largest mass) is at least 5 J/g less than the Hf of the starting vinyl terminated polyolefin having the highest Hf, preferably at least 10 J/g less, preferably at least 20 J/g less, preferably at least 30 J/g less, preferably at least 40 J/g less, preferably at least 50 J/g less, preferably at least 60 J/g less, preferably at least 70 J/g less, preferably at least 80 J/g less, preferably at least 90 J/g less.

In another embodiment, the comonomer content of the multiblock polyolefin (e.g., the selected fraction with the largest mass) is at least 5 mol % different than the comonomer content of the starting vinyl terminated polyolefin having the highest comonomer content, preferably at least 10 mol % different, preferably at least 20 mol % different, preferably at least 30 mol % different, preferably at least 40 mol % different. In another embodiment, the comonomer content, of the multiblock polyolefin (e.g., the selected fraction with the largest mass) is between the comonomer contents of the starting vinyl terminated polyolefins. A homopolymer shall be considered to have 0 mol % comonomer. Comonomer content can be measured by Fourier Transform Infrared Spectroscopy (FTIR) in conjunction with samples collected by GPC as described in Wheeler and Willis, Applied Spectroscopy, 1993, Vol. 47, pp. 1128-1130.

A commercial preparative TREF instrument (Model MC2, Polymer Char S.A.) is used to fractionate the resin into Chemical Composition Fractions. Approximately 2 g of polymer is placed into a reactor and dissolved in 200 mL of xylene, stabilized with 600 ppm of BHT, at 130° C. for approximately 60 minutes. The mixture is allowed to equilibrate for 45 minutes at 90° C., and then cooled to either 30° C. (standard procedure) or 15° C. (cryo procedure) using a cooling rate of 0.1° C./min. The temperature of the cooled mixture is increased until it is within the lowest Isolation Temperature Range to be used (see Table 2) and the mixture is heated to maintain its temperature within the specified range for 20 minutes. The mixture is sequentially filtered through a 75 micron column filter and then a 2 micron disk filter using 10 psi to 50 psi of pressurized nitrogen. The reactor is washed twice with 50 ml of xylene heated to maintain the temperature of the wash mixture within the designated temperature range and held at that temperature for 20 minutes during each wash cycle. The fractionation process is continued by introducing fresh xylene (200 mL of xylene, stabilized with 600 ppm of BHT) into the reactor, increasing the temperature of the mixture until it reaches the next highest Isolation Temperature Range in the sequence indicated in Table 2 and heating the mixture to maintain its temperature within the specified range for 20 minutes prior to filtering it as described above. The extraction cycle is sequentially repeated in this manner until the mixture has been extracted at all Isolation Temperature Ranges shown in Table 2. The extracts are independently precipitated with methanol to recover the individual polymer fractions.

TABLE 2

Preparative TREF Fractionation Isolation Temperature Ranges

| Chemical Composition Fraction Designation | | Isolation Temperature |
|---|---|---|
| Cryo Procedure | Standard Procedure | Range (° C.) |
| 1 | — | 0 to 15 |
| 2 | 1 | 15 to 36* |
| 3 | 2 | 36 to 51 |
| 4 | 3 | 51 to 59 |
| 5 | 4 | 59 to 65 |
| 6 | 5 | 65 to 71 |
| 7 | 6 | 71 to 77 |
| 8 | 7 | 77 to 83 |
| 9 | 8 | 83 to 87 |
| 10 | 9 | 87 to 91 |
| 11 | 10 | Greater than 91 |

*The Isolation Temperature Range for the Standard Procedure is 0° C. to 36° C.

In a preferred embodiment, the functionalized multiblock polyolefin has an Mn of from 400 to 120,000 g/mol, preferably from 1000 to about 60,000 g/mol, preferably from 10,000 to 45,000 g/mol, preferably from 20,000 to 42,000 g/mol, preferably about 40,000 g/mol, alternately about 20,000, alternately about 1000 g/mol.

In an embodiment, PO is a polypropylene of a Mn of about 300 to about 20,000 g/mol or PO is an ethylene/propylene copolymer of a Mn of about 300 to about 20,000 g/mol. In a preferred embodiment, at least one of the substituted or unsubstituted hydrocarbyl groups of PO and PO* contain from about 2 to about 18 carbon atoms.

The character of the "segments" or "blocks" (e.g., the PO, the segment containing "$(CR^{17}R^{18})_m—O)_n$", and PO*, if present) of the functionalized multiblock polyolefin can be confirmed by the following steps: 1. Purifying the multiblock polymer to wash away any unreacted vinyl terminated polymers to other material that is not the multiblock polyolefin. (The methods to do such will necessarily vary depending on the nature of the segment containing "$(CR^{17}R^{18})_m—O)_n$", PO, and PO*. Selection of such methods is well within the skill of one of ordinary skill in the art.); 2. Contacting the multiblock polyolefin with an agent to cause cleavage at the internal unsaturation, such as by cross metathesis with ethylene, or cleavage with ozone or permanganate (care should be taken to not cause cleavage a sites other than the internal unsaturation. Selection of such agents is well within the skill of one of ordinary skill in the art.); 3. Recovering and separating the cleaved materials. (The methods to do such will necessarily vary depending on the nature of the segment containing "$(CR^{17}R^{18})_m—O)_n$", PO and PO*. Selection of such methods is well within the skill of one of ordinary skill in the art.); and 4. Characterizing the separated materials.

This invention presumes that PO and PO* are derived from the vinyl terminated polyolefins used to make the functionalized multiblock polyolefins.

In another embodiment, the functionalized (and optionally derivatized, as described below) multiblock polyolefins described herein have less than 10% allyl chain ends, preferably less than 8%, preferably less than 6%, preferably less than 5%, preferably less than 4%, preferably less than 3%, preferably less than 2%, preferably less than 1% (relative to total unsaturations as measured by $^1$H NMR, using the protocol described in WO 2009/155471).

In another embodiment, the functionalized multiblock polyolefins described herein have less than 10% allyl chain ends, preferably less than 5%, preferably less than 1%, (relative to total unsaturations as measured by $^1$H NMR, using the protocol described in WO 2009/155471); and less than 10% vinylidene unsaturations, preferably less than 5%, preferably less than 1%, (relative to total unsaturations as measured by $^1$H NMR); and/or less than 10% vinylene unsaturations, preferably less than 5%, preferably less than 1%, (relative to total unsaturations as measured by $^1$H NMR, using the protocol described in WO 2009/155471). No hydrogen or chain transfer/termination agent should be used during functionalization, derivatization or stripping (of unreacted monomer) for measurement of unsaturations.

In another embodiment, the functionalized multiblock polyolefins consist essentially of propylene, functional group, and optionally ethylene. Alternately $C_4$ olefins (such as isobutylene, butadiene, n-butene) are substantially absent from the functionalized multiblock polyolefins. Alternately $C_{4-20}$ olefins are substantially absent from the functionalized multiblock polyolefins. Alternately isobutylene is substantially absent from the functionalized multiblock polyolefins. By substantially absent is meant that the monomer is present in the polyolefins at 1 wt % or less, preferably at 0.5 wt % or less, preferably at 0 wt %.

In another embodiment, the number of functional groups is present at 0.60 to 1.2, alternately 0.75 to 1.1 functional groups per chain (preferably assuming that Mn has not altered by more than 15% as compared to the Mn of the polyolefin prior to functionalization and optional derivatization). Number of functional groups per chain=F/Mn, as determined by $^1$H NMR as follows: the instrument used is a 400 MHz Varian pulsed Fourier transform NMR spectrometer equipped with a variable temperature proton detection probe operating at 120° C. The sample is dissolved in 1,1,2,2-tetrachloroethane-$d_2$ (TCE-$d_2$) or CDCl$_3$ and transferred into a 5 mm glass NMR tube. (The solvent has less than 10,000 ppm water and is free of other contaminants that could change the chemical shifts in the NMR spectrum.) Acquisition parameters are pulse width=45°, acquisition delay=8 s and number of scans=120. Chemical shifts are determined relative to the residual TCE-$d_1$ signal which is set to 5.98 ppm and residual CHCl$_3$, which is set at 7.24 ppm. VRA is the normalized integrated signal intensity for the vinyls with shifts between from about 4.9 to 5.1 ppm. VDRA is the normalized integrated signal intensity for the vinylidene resonances between from about 4.65 to 4.85 ppm and the vinylene resonances at from about 5.15 to 5.6 ppm. IA is the normalized integrated signal intensities for the aliphatic region of interest between from about 0 to 2.1 ppm. The number of vinyl groups/1000 Carbons (VI) is determined from the formula: (VRA*1000)/(IA+VRA+VDRA).

Likewise, the number of vinylidene & vinylene groups/1000 carbons (VE) is determined from the formula: (VDRA*1000)/(IA+VRA+VDRA). VRA, VDRA, and IA are the normalized integrated signal intensities in the chemical shift regions defined above. Mn is calculated assuming one unsaturated end-group per oligomer chain. Mn=(14,000 g/mol)/(VI+VE).

After the polyolefins in question are functionalized, it is necessary to determine the resonances/chemical shift regions of the functional group to determine % functionalization. To do so, repeat the above $^1$H NMR procedure on a clean sample of the functionalized multiblock polyolefin (e.g., washed to remove unreacted materials, contaminants, etc.). Refer to "The Sadtler Guide to NMR Spectra", Ed. William Walter Simons, published by the Sadtler Research Laboratories, 1972 for assistance in determining the shift regions for specific functional groups. The number of functional groups/1000 C's (F)=(FA*1000)/(FA+IA+VRA+VDRA), where FA=normalized integrated signal intensities in the chemical shift region of the functional group, and IA, VRA, VDRA are as defined above.

Percent functionalization of the polyolefin =(F*100)/(F+VI+VE). The number of vinyl groups/1000 carbons (VI*) and number of vinylidene groups/1000 carbons (VE*) for the functionalized multiblock polyolefin are determined from the $^1$H NMR spectra of the functionalized multiblock polyolefin in the same manner as VI and VE for the unfunctionalized multiblock polyolefin. Preferably, the percent functionalization of the polyolefin is 75% or more, preferably 80% or more, preferably 90% or more, preferably 95% or more.

The functionalized multiblock polyolefins produced herein may be used in a broad range of applications, such as compatibilizers, tie-layer modifiers, surfactants, surface modifiers, lubricants, detergents, flocculants, viscosity modifiers, Viscosity Index modifiers, emulsifiers, de-emulsifiers, dispersants, plasticizers, surfactants for soaps, detergents, fabric softeners, antistatics, oil additives, anti-fogging or wetting additives, adhesion promoters additives for lubricants and/or fuels, and the like.

Derivatization

The functionalized multiblock polyolefins described above (e.g., by Formulae (X) and (XX)) may be further derivatized as described in U.S. Pat. No. 6,022,929. For example, the functional groups will react with electrophiles to form products with new covalent bonds. Examples of carbon-based electrophiles include aldehydes, ketones, anhydrides, cyclic anhydrides, and halocarbons. Examples of silicon-based electrophiles include chlorosilanes, fluorosilanes, and bromosilanes.

In a preferred embodiment, the functionalized multiblock polyolefins described herein have been derivitized: i) by reaction with an electrophile (such as a carbon or silicon-based electrophile); ii) with a molecule containing any of the following functional groups: ketone, aldehyde, cyclic anhydride, bromide, chloride, iodide, fluoride; or iii) with a molecule containing a chlorosilane, bromosilane, or fluorosilane group.

Blends of Functionalized Multiblock polyolefins

In some embodiments, the functionalized (and optionally derivatized) multiblock polyolefins produced by this invention may used alone or blended with other polymers. Typically the functionalized (and optionally derivatized) multiblock polyolefins are present at 99.9 wt % to 0.1 wt % (typically at from 5 wt % to 99.8 wt %, alternately from 10 wt % to 99 wt %) in a blend with one or more other polymers, including but not limited to, thermoplastic polymer(s) and/or elastomer(s), based upon the weight of the blend.

In some embodiments, the functionalized (and optionally derivatized) multiblock polyolefins produced by this invention may be blended with 0.1 wt % to 99.9 wt % (typically at from 0.2 wt % to 95 wt %, alternately from 1 wt % to 90 wt %, based upon the weight of the blend) of a one or more other polymers, including but not limited to, thermoplastic polymer(s) and/or elastomer(s), based upon the weight of the blend.

By thermoplastic polymer(s) is meant a polymer that can be melted by heat and then cooled with out appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, more preferably $C_3$ to $C_{10}$ alpha-olefins. More preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene and/or butene.

By elastomers is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SI, SIS, SB, SBS, SIBS, and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the functionalized (and optionally derivatized) multiblock polyolefins produced herein may further be combined with one or more of polybutene, ethylene vinyl acetate, low density polyethylene (density 0.915 to less than 0.935 g/cm$^3$) linear low density polyethylene, ultra low density polyethylene (density 0.86 to less than 0.90 g/cm$^3$), very low density polyethylene (density 0.90 to less than 0.915 g/cm$^3$), medium density polyethylene (density 0.935 to less than 0.945 g/cm$^3$), high density polyethylene (density 0.945 to 0.98 g/cm$^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, copolymers of ethylene and vinyl alcohol (EVOH), polymers of aromatic monomers, such as polystyrene, poly-1 esters, polyacetal, polyvinylidine fluoride, polyethylene glycols, and/or polyisobutylene. Preferred polymers include those available from ExxonMobil Chemical Company in Baytown, Tex. under the tradenames EXCEED™ and EXACT™.

Tackifiers may be blended with the functionalized (and optionally derivatized) multiblock polyolefins produced herein and/or with blends of the functionalized (and optionally derivatized) multiblock polyolefins produced by this invention (as described above). Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the tackifier is hydrogenated. In some embodiments, the tackifier has a softening point (Ring and Ball, as measured by ASTM E-28) of 80° C. to 140° C., preferably 100° C. to 130° C. The tackifier, if present, is typically present at about 1 wt % to about 50 wt %, based upon the weight of the blend, more preferably 10 wt % to 40 wt %, even more preferably 20 wt % to 40 wt %.

In another embodiment, the functionalized (and optionally derivatized) multiblock polyolefins of this invention, and/or blends thereof, further comprise typical additives known in the art, such as fillers, cavitating agents, antioxidants, surfactants, adjuvants, plasticizers, block, antiblock, color masterbatches, pigments, dyes, processing aids, UV stabilizers, neutralizers, lubricants, waxes, and/or nucleating agents. The additives may be present in the typically effective amounts well known in the art, such as 0.001 wt % to 10 wt %. Preferred fillers, cavitating agents and/or nucleating agents include titanium dioxide, calcium carbonate, barium sulfate, silica, silicon dioxide, carbon black, sand, glass beads, mineral aggregates, talc, clay, inorganic or metallic particles (preferably graphene; graphene oxide, single wall nanotubes and multi wall nanotubes), and the like. Preferred antioxidants include phenolic antioxidants, such as Irganox 1010, Irganox, 1076 both available from Ciba-Geigy. Preferred oils include paraffinic or naphthenic oils such as Primol 352 or Primol 876 available from ExxonMobil Chemical France, S.A. in Paris, France. More preferred oils include aliphatic naphthenic oils, white oils, or the like.

In a particularly preferred embodiment, the functionalized (and optionally derivatized) multiblock polyolefins produced herein are combined with polymers (elastomeric and/or thermoplastic) having anhydride, acid or isocyanate functional groups under conditions such that they react. Reaction may be confirmed by an at least 20% (preferably at least 50%, preferably at least 100%) increase in Mw as compared to the Mw of the functionalized multiblock polyolefin prior to reaction. Such reaction conditions may be increased heat (for example, above the Tm of the functionalized multiblock polyolefin), increased shear (such as from a reactive extruder), presence or absence of solvent, and the like. Useful polymers having functional groups that can be reacted with the functionalized multiblock polyolefins produced herein include polyesters, polyvinyl acetates, nylons (polyamides), polybutadiene, nitrile rubber, hydroxylated nitrile rubber, ethylene-acrylic acid copolymers and terpolymers, as well as ionomers.

Process to Produce the Functionalized Multiblock Polyolefins

This invention relates to a process to produce a functionalized multiblock polyolefin comprising contacting an alkene metathesis catalyst with an acrylate or methacrylate functionalized polyalkylene glycol, and one or more vinyl terminated polyolefins (oligomers or polymers), preferably comprising one or more of the vinyl terminated polyolefins described herein.

The reactants are typically combined in a reaction vessel at a temperature of 20° C. to 200° C. (preferably 50° C. to 160° C., preferably 60° C. to 140° C.) and a pressure of 0 to 1000 MPa (preferably 0.5 to 500 MPa, preferably 1 to 250 MPa) for a residence time of 0.5 seconds to 10 hours (preferably 1 second to 5 hours, preferably 1 minute to 1 hour).

Typically, from about 0.4 to about 4.0 (e.g., 0.5 to 2.6), preferably from about 1.0 to about 2.0, and most preferably from about 1.1 to about 1.7 moles of the acrylate or methacrylate functionalized polyalkylene glycol reactant are charged to the reactor per mole of polyolefin charged.

Typically, 0.00001 to 0.1 moles, preferably 0.0001 to 0.02 moles, preferably 0.0005 to 0.01 moles of catalyst are charged to the reactor per mole of polyolefin charged.

The process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 volume % or more.) Alternately no solvent or diluent is present or added in the reaction medium (except for the small amounts used as the carrier for the catalyst or other additives, or amounts typically found with the reactants; e.g., propane in propylene).

Suitable diluents/solvents for the process include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at less than 0.5 wt %, preferably at 0 wt % based upon the weight of the solvents. In a preferred embodiment, the feed concentration for the process is 60 volume % solvent or less, preferably 40 volume % or less, preferably 20 volume % or less.

The process may be batch, semi-batch, or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruder, pipe, or pump).

In a preferred embodiment, the productivity of the process is at least 200 g of functionalized multiblock polyolefin per mmol of catalyst per hour, preferably at least 5000 g/mmol/hour, preferably at least 10,000 g/mmol/hr, preferably at least 300,000 g/mmol/hr.

In a preferred embodiment, the yield of the catalyst is at least 50 mols of functionalized multiblock polyolefin per mol of catalyst, preferably 100 mols of functionalized multiblock polyolefin per mol of catalyst, preferably 200 mols of functionalized multiblock polyolefin per mol of catalyst.

This invention further relates to a process, preferably an in-line process, preferably a continuous process, to produce functionalized multiblock polyolefin, comprising introducing monomer and catalyst system into a reactor, obtaining a reactor effluent containing vinyl terminated polyolefin, optionally removing (such as flashing off) solvent, unused monomer and/or other volatiles, obtaining vinyl terminated polyolefin (such as those described herein), introducing vinyl terminated polyolefin, alkene metathesis catalyst and acrylate or methacrylate functionalized polyalkylene glycol (as described herein) into a reaction zone (such as a reactor, an extruder, a pipe, and/or a pump), and obtaining functionalized multiblock polyolefin (such as those described herein).

Alkene Metathesis Catalysts

An alkene metathesis catalyst is a compound that catalyzes the reaction between a vinyl terminated polyolefin with an acrylate or methacrylate functionalized polyalkylene glycol to produce an ester functionalized multiblock polyolefin, typically with the elimination of ethylene.

In a preferred embodiment, the alkene metathesis catalyst is represented by the Formula (I):

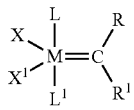

Formula (I)

where:

M is a Group 8 metal, preferably Ru or Os, preferably Ru;

X and $X^1$ are, independently, any anionic ligand, preferably a halogen (preferably Cl), an alkoxide or a triflate, or X and $X^1$ may be joined to form a dianionic group and may form single ring of up to 30 non-hydrogen atoms or a multinuclear ring system of up to 30 non-hydrogen atoms;

L and $L^1$ are, independently, a neutral two electron donor, preferably a phosphine or a N-heterocyclic carbene, L and $L^1$ may be joined to form a single ring of up to 30 non-hydrogen atoms or a multinuclear ring system of up to 30 non-hydrogen atoms;

L and X may be joined to form a multidentate monoanionic group and may form single ring of up to 30 non-hydrogen atoms or a multinuclear ring system of up to 30 non-hydrogen atoms;

$L^1$ and $X^1$ may be joined to form a multidentate monoanionic group and may form single ring of up to 30 non-hydrogen atoms or a multinuclear ring system of up to 30 non-hydrogen atoms;

R and $R^1$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);

$R^1$ and $L^1$ or $X^1$ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

Preferred alkoxides include those where the alkyl group is a phenol, substituted phenol (where the phenol may be substituted with up to 1, 2, 3, 4, or 5 $C_1$ to $C_{12}$ hydrocarbyl groups) or a $C_1$ to $C_{10}$ hydrocarbyl, preferably a $C_1$ to $C_{10}$ alkyl group, preferably methyl, ethyl, propyl, butyl, or phenyl.

Preferred triflates are represented by the Formula (II):

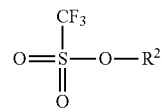

Formula (II)

where $R^2$ is hydrogen or a $C_1$ to $C_{30}$ hydrocarbyl group, preferably a $C_1$ to $C_{12}$ alkyl group, preferably methyl, ethyl, propyl, butyl, or phenyl.

Preferred N-heterocyclic carbenes are represented by the Formula (III) or the Formula (IV):

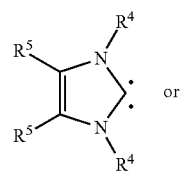

Formula (III)

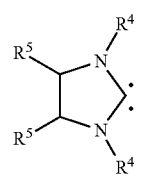

Formula (IV)

where:

each $R^4$ is independently a hydrocarbyl group or substituted hydrocarbyl group having 1 to 40 carbon atoms, preferably methyl, ethyl, propyl, butyl (including isobutyl and n-butyl), pentyl, cyclopentyl, hexyl, cyclohexyl, octyl, cyclooctyl, nonyl, decyl, cyclodecyl, dodecyl, cyclododecyl, mesityl, adamantyl, phenyl, benzyl, toluoyl, chlorophenyl, phenol, substituted phenol, or $CH_2C(CH_3)_3$; and each $R^5$ is hydrogen, a halogen, or a $C_1$ to $C_{12}$ hydrocarbyl group, preferably hydrogen, bromine, chlorine, methyl, ethyl, propyl, butyl, or phenyl.

In other useful embodiments, one of the N groups bound to the carbene in formula (III) or (IV) is replaced with an S, O, or P atom, preferably an S atom.

Other useful N-heterocyclic carbenes include the compounds described in Hermann, W. A., Chem. Eur. J., 1996, 2, pp. 772 and 1627; Enders, D. et al., Angew. Chem. Int. Ed., 1995, 34, pg. 1021; Alder R. W., Angew. Chem. Int. Ed., 1996, 35, pg. 1121; and Bertrand, G. et al., Chem. Rev., 2000, 100, pg. 39.

In a preferred embodiment, the alkene metathesis catalyst is one or more of tricyclohexylphosphine[1,3-bis(2,4,6-trimethylphenyl)imidazol-2-ylidene][3-phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazo 1-2-ylidene]ruthenium(II) dichloride, tricyclohexylphosphine[1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II) dichloride, 1,3-Bis(2,4,6-trimethylphenyl)-4,5-dihydroimidazol-2-ylidene[2-(1-propoxy)-5-(N,N-dimethylaminosulfonyl)phenyl]methyleneruthenium(II) dichloride, and [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride.

In another embodiment, the alkene metathesis catalyst is represented in Formula (I) above, where: M is Os or Ru; $R^1$ is hydrogen; X and $X^1$ may be different or the same and are any anionic ligand; L and $L^1$ may be different or the same and are any neutral electron donor; and R may be hydrogen, substituted or unsubstituted alkyl, or substituted or unsubstituted aryl. R is preferably hydrogen, $C_1$-$C_{20}$ alkyl, or aryl. The $C_1$-$C_{20}$ alkyl may optionally be substituted with one or more aryl, halide, hydroxy, $C_1$-$C_{20}$ alkoxy, or $C_2$-$C_{20}$ alkoxycarbonyl groups. The aryl may optionally be substituted with one or more $C_1$-$C_{20}$ alkyl, aryl, hydroxyl, $C_1$-$C_5$ alkoxy, amino, nitro, or halide groups. L and $L^1$ are preferably phosphines of the formula $PR^{3'}R^{4'}R^{5'}$, where $R^{3'}$ is a secondary alkyl or cycloalkyl, and $R^{4'}$ and $R^{5'}$ are aryl, $C_1$-$C_{10}$ primary alkyl, secondary alkyl, or cycloalkyl. $R^{4'}$ and $R^{5'}$ may be the same or different. L and $L^1$ preferably the same and are —P(cyclohexyl)$_3$, —P(cyclopentyl)$_3$, or —P(isopropyl)$_3$. X and $X^1$ are most preferably the same and are chlorine.

In another embodiment of the present invention, the ruthenium and osmium carbene compounds have the Formula (V):

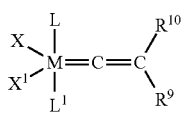

Formula (V)

where M is Os or Ru, preferably Ru; X, $X^1$, L, and $L^1$ are as described above; and $R^9$ and $R^{10}$ may be different or the same and may be hydrogen, substituted or unsubstituted alkyl, or substituted or unsubstituted aryl. The $R^9$ and $R^{10}$ groups may optionally include one or more of the following functional groups: alcohol, thiol, ketone, aldehyde, ester, ether, amine, imine, amide, nitro, carboxylic acid, disulfide, carbonate, isocyanate, carbodiimide, carboalkoxy, and halogen groups. Such compounds and their synthesis are described in U.S. Pat. No. 6,111,121.

In another embodiment, the alkene metathesis catalyst useful herein may be any of the catalysts described in U.S. Pat. Nos. 6,111,121; 5,312,940; 5,342,909; 7,329,758; 5,831,108; 5,969,170; 6,759,537; 6,921,735; and U.S. Patent Application Publication No. 2005-0261451 A1, including but not limited to, benzylidene-bis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-Bis-(2,4,6-trimethylphenyl)-2-imidazolidinylidene)dichloro(o-isopropoxyphenylmethylene)ruthenium, 1,3-Bis(2-methylphenyl)-2-imidazolidinylidene]dichloro(2-isopropoxyphenylmethylene) ruthenium(II), [1,3-Bis(2,4,6-trimethylphenyl)-2-imidazolidinylidene]dichloro[3-(2-pyridinyl)propylidene]ruthenium(II), [1,3-Bis(2-methylphenyl)-2-imidazolidinylidene]dichloro (phenylmethylene)(tricyclohexylphosphine)ruthenium(II), [1,3-Bis(2,4,6-trimethylphenyl)-2-imidazolidinylidene] dichloro(3-methyl-2-butenylidene) (tricyclohexylphosphine)ruthenium(II), and [1,3-Bis(2,4,6-trimethylphenyl)-2-imidazolidinylidene]dichloro(benzylidene)bis(3-bromopyridine)ruthenium(II).

In another embodiment, the alkene metathesis catalyst is represented by the formula:

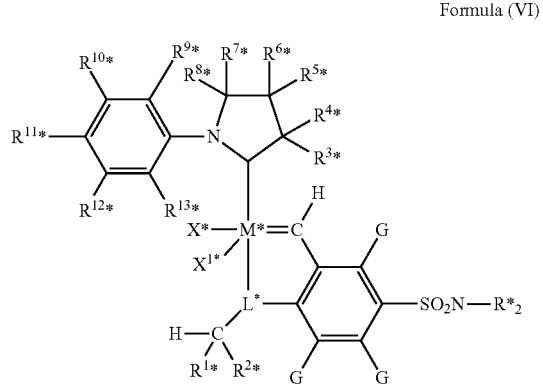

Formula (VI)

where:
M* is a Group 8 metal, preferably Ru or Os, preferably Ru;
X* and $X^{1*}$ are, independently, any anionic ligand, preferably a halogen (preferably Cl), an alkoxide or an alkyl sulfonate, or X and $X^1$ may be joined to form a dianionic group and may form single ring of up to 30 non-hydrogen atoms or a multinuclear ring system of up to 30 non-hydrogen atoms;
L* is N, O, P, or S, preferably N or O;
R* is hydrogen or a $C_1$ to $C_{30}$ hydrocarbyl or substituted hydrocarbyl, preferably methyl;
$R^{1*}$, $R^{2*}$, $R^{3*}$, $R^{4*}$, $R^{5*}$, $R^{6*}$, $R^{7*}$, and $R^{8*}$ are, independently, hydrogen or a $C_1$ to $C_{30}$ hydrocarbyl or substituted hydrocarbyl, preferably methyl, ethyl, propyl or butyl, preferably $R^{1*}$, $R^{2*}$, $R^{3*}$, and $R^{4*}$ are methyl;
each $R^{9*}$ and $R^{13*}$ are, independently, hydrogen or a $C_1$ to $C_{30}$ hydrocarbyl or substituted hydrocarbyl, preferably a $C_2$ to $C_6$ hydrocarbyl, preferably ethyl;
$R^{10*}$, $R^{11*}$, $R^{12*}$ are, independently hydrogen or a $C_1$ to $C_{30}$ hydrocarbyl or substituted hydrocarbyl, preferably hydrogen or methyl;
each G, is, independently, hydrogen, halogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);
where any two adjacent R groups may form a single ring of up to 8 non-hydrogen atoms or a multinuclear ring system of up to 30 non-hydrogen atoms.

Preferably, any two adjacent R groups may form a fused ring having from 5 to 8 non hydrogen atoms. Preferably the non-hydrogen atoms are C and/or O. Preferably the adjacent R groups form fused rings of 5 to 6 ring atoms, preferably 5 to 6 carbon atoms. By adjacent is meant any two R groups located next to each other, for example $R^{3*}$ and $R^{4*}$ can form a ring and/or $R^{11*}$ and $R^{12*}$ can form a ring.

In a preferred embodiment, the metathesis catalyst compound comprises one or more of: 2-(2,6-diethylphenyl)-3,5,5,5-tetramethylpyrrolidine[2-(1-propoxy)-5-(N,N-dimethylaminosulfonyl)phenyl]methylene ruthenium dichloride; 2-(mesityl)-3,3,5,5-tetramethylpyrrolidine[2-(1-propoxy)-5-(N,N-dimethylaminosulfonyl)phenyl]methylene ruthenium dichloride; 2-(2-isopropyl)-3,3,5,5-tetramethylpyrrolidine [2-(1-propoxy)-5-(N,N-dimethylaminosulfonyl)phenyl]methylene ruthenium dichloride; 2-(2,6-diethyl-4-fluorophenyl)-3,3,5,5-tetramethylpyrrolidine[2-(1-propoxy)-5-(N,N-dimethylaminosulfonyl)phenyl]methylene ruthenium dichloride, or mixtures thereof.

For further information on such alkene metathesis catalysts, please see U.S. Ser. No. 12/939,054, filed Nov. 3, 2010, claiming priority to and the benefit of U.S. Ser. No. 61/259,514, filed Nov. 9, 2009.

The above named catalysts are generally available from Sigma-Aldrich Corp. (St. Louis, Mo.) or Strem Chemicals, Inc. (Newburyport, Mass.).

Acrylate or Methacrylate Functionalized Polyalkylene Glycols

Acrylate or methacrylate functionalized polyalkylene glycols useful in the process described herein include those represented by the formula (XII) or (XXII):

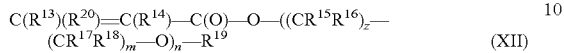

(XII)

or

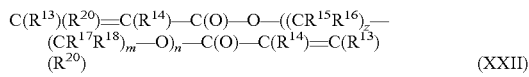

(XXII)

wherein $R^{13}$, $R^{14}$, $R^{15}$, $R^{16}$, $R^{17}$, and $R^{18}$ are each, independently, a substituted or unsubstituted $C_1$ through $C_4$ hydrocarbyl group (preferably substituted or unsubstituted methyl, ethyl, propyl, butyl, and isomers thereof) or a hydrogen;

$R^{19}$ is a $C_1$ to a $C_{20}$ substituted or unsubstituted hydrocarbyl group (preferably substituted or unsubstituted methyl, ethyl, propyl, butyl, pentyl, hexyl, heptyl, octyl, nonyl, decyl, docecyl, and isomers thereof) or a hydrogen;

$R^{20}$ is a hydrogen or a $C_1$ to a $C_4$ substituted or unsubstituted hydrocarbyl group (preferably substituted or unsubstituted methyl, ethyl, propyl, butyl, and isomers thereof);

z is ≥1 to about 5, preferably 2, 3, 4, or 5;

m is ≥1 to about 5, preferably 2, 3, 4, or 5; and n is from 1 to about 10,000, preferably 2 to 1000, preferably 3 to 500, preferably 4 to 300, preferably 4 to 150, preferably 4 to 50, preferably 4 to 20.

In a preferred embodiment, of Formula (XII) $R^{13}$, $R^{14}$, $R^{15}$, $R^{16}$, $R^{17}$, and $R^{18}$ are each hydrogen atoms and $R^{19}$ is a hydrogen, a methyl, or an ethyl group. In a preference embodiment, Formula (XXII) $R^{13}$, $R^{14}$, $R^{15}$, $R^{16}$, $R^{17}$, and $R^{18}$ are hydrogen and $R^{20}$ is hydrogen, methyl or ethyl group.

In a preferred embodiment z is 1, m is 1, and n is from 2 to about 1000; alternately z is 2, m is 1, and n is from 2 to about 1000; alternately z is 2, m is 2, and n is from 2 to about 1000.

In a preferred embodiment, the acrylate or methacrylate functionalized polyalkylene glycols (where the alkyl is a $C_1$ to $C_{20}$ alkyl group, such as methyl, ethyl, propyl, butyl, pentyl, hexyl, octyl, nonyl, decyl undecyl, dodecyl, and isomers thereof), is an acrylate or methacrylate functionalized polyethylene glycols, preferably one or more of poly(ethylene glycol)diacrylate, poly(ethylene glycol) methyl ether acrylate, poly(ethylene glycol) methyl acrylate, and the like.

Vinyl Terminated Polyolefins

In another embodiment, this invention can be practiced with any vinyl containing materials, preferably with vinyl terminated polyolefins (including vinyl terminated polymers, (such as vinyl terminated ethylene homo- and co-polymers, and vinyl terminated propylene homo- and co-polymers). Many of these materials are known in the art and can be functionalized using the processes described herein, e.g., contacting an alkene metathesis catalyst (as described herein) with a acrylate or methacrylate functionalized polyalkylene glycol (as described herein) and one or more vinyl containing materials. Vinyl terminated polymers include homo- and co-polymers of heteroatom containing monomers, as well as polymers of olefin monomers only. (The term vinyl terminated polymers includes vinyl terminated oligomers.) Preferred vinyl terminated polyolefins include vinyl terminated isotactic polypropylene (preferably having a melting point of 100° C. or more, preferably 155° C. or more), polyethylene (preferably having a melting point of 100° C. or more, preferably 155° C. or more).

Vinyl terminated polyolefins (olefin oligomers and polymers) useful in this invention include propylene homo-oligomers, comprising propylene and less than comonomer, preferably 0 wt % comonomer, wherein the oligomer has:

i) at least 93% allyl chain ends (preferably at least 95%, preferably at least 97%, preferably at least 98%);

ii) a number average molecular weight (Mn) of about 500 to about 20,000 g/mol, as measured by $^1$H NMR (preferably 500 to 15,000, preferably 700 to 10,000, preferably 800 to 8,000 g/mol, preferably 900 to 7,000, preferably 1000 to 6,000, preferably 1000 to 5,000);

iii) an isobutyl chain end to allylic vinyl group ratio of 0.8:1 to 1.3:1.0; and iv) less than 1400 ppm aluminum, (preferably less than 1200 ppm, preferably less than 1000 ppm, preferably less than 500 ppm, preferably less than 100 ppm).

Vinyl terminated olefin oligomers and polymers useful in this invention also include propylene co-oligomers having an Mn of 300 to 30,000 g/mol as measured by $^1$H NMR (preferably 400 to 20,000, preferably 500 to 15,000, preferably 600 to 12,000, preferably 800 to 10,000, preferably 900 to 8,000, preferably 900 to 7,000 g/mol), comprising 10 to 90 mol % propylene (preferably 15 to 85 mol %, preferably 20 to 80 mol %, preferably 30 to 75 mol %, preferably 50 to 90 mol %) and 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, preferably ethylene), wherein the oligomer has at least X % allyl chain ends (relative to total unsaturations), where: 1) X=(−0.94 (mol % ethylene incorporated)+100 {alternately 1.20 (−0.94 (mol % ethylene incorporated)+100), alternately 1.50(−0.94 (mol % ethylene incorporated)+100)}), when 10 to 60 mol % ethylene is present in the co-oligomer, and 2) X=45 (alternately 50, alternately 60), when greater than 60 mol % and less than 70 mol % ethylene is present in the co-oligomer, and 3) X=(1.83* (mol % ethylene incorporated)−83, {alternately 1.20 [1.83* (mol % ethylene incorporated)−83], alternately 1.50 [1.83* (mol % ethylene incorporated)−83]}), when 70 to 90 mol % ethylene is present in the co-oligomer. Alternately X is 80% or more, preferably 85% or more, preferably 90% or more, preferably 95% or more. In an alternate embodiment, the oligomer has at least 80% isobutyl chain ends (based upon the sum of isobutyl and n-propyl saturated chain ends), preferably at least 85% isobutyl chain ends, preferably at least 90% isobutyl chain ends. Alternately, the oligomer has an isobutyl chain end to allylic vinyl group ratio of 0.8:1 to 1.35:1.0, preferably 0.9:1 to 1.20:1.0, preferably 0.9:1.0 to 1.1:1.0.

Vinyl terminated olefin oligomers and polymers useful in this invention also include propylene oligomers, comprising more than 90 mol % propylene (preferably 95 to 99 mol %, preferably 98 to 99 mol %) and less than 10 mol % ethylene (preferably 1 to 4 mol %, preferably 1 to 2 mol %), wherein the oligomer has:

i) at least 93% allyl chain ends (preferably at least 95%, preferably at least 97%, preferably at least 98%);

ii) a number average molecular weight (Mn) of about 400 to about 30,000 g/mol, as measured by $^1$H NMR (preferably 500 to 20,000, preferably 600 to 15,000, preferably 700 to 10,000, preferably 800 to 9,000, preferably 900 to 8,000, preferably 1000 to 6,000);

iii) an isobutyl chain end to allylic vinyl group ratio of 0.8:1 to 1.35:1.0, and iv) less than 1400 ppm aluminum, (preferably less than 1200 ppm, preferably less than 1000 ppm, preferably less than 500 ppm, preferably less than 100 ppm).

Vinyl terminated olefin oligomers and polymers useful in this invention also include propylene oligomers, comprising: at least 50 (preferably 60 to 90, preferably 70 to 90) mol % propylene and from 10 to 50 (preferably 10 to 40, preferably 10 to 30) mol % ethylene, wherein the oligomer has:
 i) at least 90% allyl chain ends (preferably at least 91%, preferably at least 93%, preferably at least 95%, preferably at least 98%);
 ii) an Mn of about 150 to about 20,000 g/mol, as measured by $^1$H NMR (preferably 200 to 15,000, preferably 250 to 15,000, preferably 300 to 10,000, preferably 400 to 9,500, preferably 500 to 9,000, preferably 750 to 9,000); and
 iii) an isobutyl chain end to allylic vinyl group ratio of 0.8:1 to 1.3:1.0, wherein monomers having four or more carbon atoms are present at from 0 to 3 mol % (preferably at less than 1 mol %, preferably less than 0.5 mol %, preferably at 0 mol %).

Vinyl terminated olefin oligomers and polymers useful in this invention also include propylene oligomers, comprising: at least 50 (preferably at least 60, preferably 70 to 99.5, preferably 80 to 99, preferably 90 to 98.5) mol % propylene, from 0.1 to 45 (alternately at least 35, preferably 0.5 to 30, preferably 1 to 20, preferably 1.5 to 10) mol % ethylene, and from 0.1 to 5 (preferably 0.5 to 3, preferably 0.5 to 1) mol % $C_4$ to $C_{12}$ olefin (such as butene, hexene, or octene, preferably butene), wherein the oligomer has:
 i) at least 90% allyl chain ends (preferably at least 91%, preferably at least 93%, preferably at least 95%, preferably at least 98%);
 ii) a number average molecular weight (Mn) of about 150 to about 15,000 g/mol, as measured by $^1$H NMR (preferably 200 to 12,000, preferably 250 to 10,000, preferably 300 to 10,000, preferably 400 to 9500, preferably 500 to 9,000, preferably 750 to 9,000); and
 iii) an isobutyl chain end to allylic vinyl group ratio of 0.8:1 to 1.35:1.0.

Vinyl terminated olefin oligomers and polymers useful in this invention also include propylene oligomers, comprising: at least 50 (preferably at least 60, preferably 70 to 99.5, preferably 80 to 99, preferably 90 to 98.5) mol % propylene, from 0.1 to 45 (alternately at least 35, preferably 0.5 to 30, preferably 1 to 20, preferably 1.5 to 10) mol % ethylene, and from 0.1 to 5 (preferably 0.5 to 3, preferably 0.5 to 1) mol % diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the oligomer has:
 i) at least 90% allyl chain ends (preferably at least 91%, preferably at least 93%, preferably at least 95%, preferably at least 98%);
 ii) a number average molecular weight (Mn) of about 150 to about 20,000 g/mol, as measured by $^1$H NMR (preferably 200 to 15,000, preferably 250 to 12,000, preferably 300 to 10,000, preferably 400 to 9,500, preferably 500 to 9,000, preferably 750 to 9,000); and
 iii) an isobutyl chain end to allylic vinyl group ratio of 0.7:1 to 1.35:1.0.

In another embodiment, the vinyl terminated polyolefins useful herein may be one or more vinyl terminated macromers having an Mn (measured by $^1$H NMR) of 200 g/mol or more, (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol); and comprising: (i) from about 20 to 99.9 mol % (preferably from about 25 to about 90 mol %, from about 30 to about 85 mol %, from about 35 to about 80 mol %, from about 40 to about 75 mol %, or from about 50 to about 95 mol %) of at least one $C_5$ to $C_{40}$ olefin (preferably $C_5$ to $C_{30}$ α-olefins, more preferably $C_5$-$C_{20}$ α-olefins, preferably, $C_5$-$C_{12}$ α-olefins, preferably pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene); and (ii) from about 0.1 to 80 mol % of propylene (preferably from about 5 to 70 mol %, from about 10 to 65 mol %, from about 15 to 55 mol %, from about 25 to 50 mol %, or from about 30 to 80 mol %); wherein the vinyl terminated polyolefin has at least 40% allyl chain ends (preferably at least 50% allyl chain ends, at least 60% allyl chain ends, at least 70% allyl chain ends; at least 80% allyl chain ends, at least 90% allyl chain ends; at least 95% allyl chain ends); and, optionally, an isobutyl chain end to allylic chain end ratio of less than 0.70:1 (preferably less than 0.65:1, less than 0.60:1, less than 0.50:1, or less than 0.25:1); and further optionally, an allyl chain end to vinylidene chain end (as determined by $^1$H NMR) ratio of more than 2:1 (preferably more than 2.5:1, more than 3:1, more than 5:1, or more than 10:1), and further optionally, an allyl chain end to vinylene chain end ratio of greater than 10:1 (preferably greater than 15:1, or greater than 20:1); and even further optionally preferably substantially no isobutyl chain ends (preferably less than 0.1 wt % isobutyl chain ends). For further information on such VTM's please see concurrently filed U.S. Ser. No. 13/072,249, filed Mar. 25, 2011, entitled "Vinyl Terminated Higher Olefin Copolymers and Methods to Produce Thereof."

In another embodiment, the vinyl terminated polyolefin useful herein may be one or more vinyl terminated polyolefins having an Mn (measured by $^1$H NMR) of 200 g/mol or more (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol) and comprises: (i) from about 80 to 99.9 mol % (preferably 85 to 99.9 mol %, more preferably 90 to 99.9 mol %) of at least one $C_4$ olefin (preferably 1-butene); and (ii) from about 0.1 to 20 mol % of propylene (preferably 0.1 to 15 mol %, more preferably 0.1 to 10 mol %); wherein the VTM has at least 40% allyl chain ends, preferably at least 50% allyl chain ends, at least 60% allyl chain ends, at least 70% allyl chain ends; or at least 80% allyl chain ends; and, optionally, an isobutyl chain end to allylic chain end ratio of less than 0.70:1, less than 0.65:1, less than 0.60:1, less than 0.50:1, or less than 0.25:1; and further optionally, an allyl chain end to vinylidene chain end ratio of more than 2:1, more than 2.5:1, more than 3:1, more than 5:1, or more than 10:1; and further optionally, an allyl chain end to vinylene chain end ratio of greater than 10:1 (preferably greater than 15:1, or greater than 20:1); and even further optionally, preferably substantially no isobutyl chain ends (preferably less than 0.1 wt % isobutyl chain ends). For further information on such vinyl terminated polyolefin's please see concurrently filed U.S. Ser. No. 13/072,249, filed Mar. 25, 2011, entitled "Vinyl Terminated Higher Olefin Copolymers and Methods to Produce Thereof."

In particular embodiments herein, the vinyl terminated polyolefin useful herein may be a vinyl terminated polyolefin having an Mn of at least 200 g/mol, (preferably 200 to 100,000 g/mol, preferably 200 to 75,000 g/mol, preferably 200 to 60,000 g/mol, preferably 300 to 60,000 g/mol, or preferably 750 to 30,000 g/mol) (measured by $^1$H NMR) comprising of one or more (preferably two or more, three or more, four or more, and the like) $C_4$ to $C_{40}$ (preferably $C_4$ to $C_{30}$, $C_4$ to $C_{20}$, or $C_4$ to $C_{12}$, preferably butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) higher olefin derived units, where the vinyl terminated higher olefin polymer comprises substantially no propylene derived units (preferably less than 0.1 wt % propylene); and wherein the higher olefin polymer has at least 5% (at least 10%, at least 15%, at least 20%, at least 30%, at least 40%, at least 50%, at least 60%, at least 70% allyl; at least 80%, at least 90%, or at least 95%) allyl chain ends; and optionally, an allyl chain end to vinylidene chain end ratio of greater than 2:1 (preferably greater than 2.5:1, greater than 3:1, greater than 5:1, or greater than 10:1); and further optionally, an allyl chain end to vinylene chain end ratio of greater than 10:1 (preferably greater than 15:1, or greater than 20:1); and even further optionally, preferably substantially no isobutyl chain ends (preferably less than 0.1 wt % isobutyl chain ends). In some embodiments, these higher olefin vinyl terminated polymers may comprise ethylene derived units, preferably at least 5 mol % ethylene (preferably at least 15 mol % ethylene, preferably at least 25 mol % ethylene, preferably at least 35 mol % ethylene, preferably at least 45 mol % ethylene, preferably at least 60 mol % ethylene, preferably at least 75 mol % ethylene, or preferably at least 90 mol % ethylene). For further information on such vinyl terminated polyolefins please see concurrently filed U.S. Ser. No. 13/072,288, filed Mar. 25, 2011, entitled "Vinyl Terminated Higher Olefin Polymers and Methods to Produce Thereof."

In another embodiment, the vinyl terminated polyolefin useful herein is a branched polyolefin having an Mn of 7,500 to 60,000 g/mol (and optionally a Tm of greater than 60° C. (preferably greater than 100° C.), and/or, optionally, a ΔHf of greater than 7 J/g (preferably greater than 50 J/g)) comprising one or more alpha olefins (preferably ethylene and or propylene and optionally a $C_4$ to $C_{10}$ alpha olefin), said branched polyolefin having: (i) 50 mol % or greater allyl chain ends, relative to total unsaturated chain ends (preferably 60% or more, preferably 70% or more, preferably 80% or more, preferably 90% or more, preferably 95% or more); (ii) a g'(vis) of 0.90 or less (preferably 0.85 or less, preferably 0.80 or less); (iii) optionally, an allyl chain end to internal vinylidene ratio of greater than 5:1 (preferably greater than 10:1); and (iv) optionally, an allyl chain end to vinylidene chain end ratio of greater than greater than 10:1 (preferably greater than 15:1).

In another embodiment, the vinyl terminated polyolefin useful herein is a branched polyolefin having an Mn of 60,000 g/mol or more (and optionally a Tm of greater than 60° C. (preferably greater than 100° C.), and/or, optionally, a ΔHf of greater than 7 J/g (preferably greater than 50 J/g)) comprising one or more alpha olefins (preferably ethylene and/or propylene and optionally a $C_4$ to $C_{10}$ alpha olefin), and having: (i) 50 mol % or greater allyl chain ends, relative to total unsaturated chain ends (preferably 60% or more, preferably 70% or more, preferably 80% or more, preferably 90% or more, preferably 95% or more); (ii) a g'(vis) of 0.90 or less (preferably 0.85 or less, preferably 0.80 or less); (iii) a bromine number which, upon complete hydrogenation, decreases by at least 50% (preferably at least 75%); (iv) optionally, an allyl chain end to internal vinylidene ratio of greater than 5:1 (preferably greater than 10:1); and (v) optionally, an allyl chain end to vinylidene chain end ratio of greater than 10:1 preferably greater than 15:1).

In another embodiment, the vinyl terminated polyolefin useful herein is a branched polyolefin having an Mn of less than 7,500 g/mol, preferably from 100 to 7,000 g/mol, preferably form 400 to 6,500 g/mol (and optionally a Tm of greater than 60° C. (preferably greater than 100° C.), and/or, optionally, a ΔHf of greater than 7 J/g (preferably greater than 50 J/g)) comprising one or more alpha olefins (preferably ethylene and or propylene and optionally a $C_4$ to $C_{10}$ alpha olefin), and having: (i) 50 mol % or greater allyl chain ends, relative to total unsaturated chain ends (preferably 60% or more, preferably 70% or more, preferably 80% or more, preferably 90% or more, preferably 95% or more); (ii) a ratio of percentage of saturated chain ends to percentage of allyl chain ends of 1.2 to 2.0 (preferably isobutyl chain ends) to percentage of allyl chain ends of 1.6 to 1.8, wherein the percentage of saturated chain ends is determined using $^{13}$C NMR as described in WO 2009/155471 at paragraph [0095] and [0096] except that the spectra are referenced to the chemical shift of the solvent, tetrachloroethane-$d_2$, and/or a ratio of Mn(GPC)/Mn($^1$H NMR) of 0.95 or less (preferably 0.90 or less, preferably 0.85 or less, preferably 0.80 or less); and (iii) optionally, a bromine number which, upon complete hydrogenation, decreases by at least 50% (preferably by at least 75%); (iv) optionally, an allyl chain end to internal vinylidene ratio of greater than 5:1 (preferably greater than 10:1); and (v) optionally, an allyl chain end to vinylidene chain end ratio of greater than 2:1 (preferably greater than 10:1), preferably the branched vinyl terminated polyolefin has a ratio of Mn(GPC)/Mn($^1$H NMR) of 0.95 or less (preferably 0.90 or less, preferably 0.85 or less, preferably 0.80 or less).

$C_4$ to $C_{10}$ alpha olefin monomers useful in the branched polymers described above include butene, pentene, hexene, heptene, octene, nonene, decene, cyclopentene, cycloheptene, cyclooctene, cyclooctadiene, and isomers thereof.

For more information on useful branched polymers and methods to produce them, please see concurrently filed U.S. Ser. No. 61/467,681, filed Mar. 25, 2011, entitled "Branched Vinyl Terminated Polymers and Methods for Production Thereof".

Any of the vinyl terminated polyolefins described herein preferably have less than 1400 ppm aluminum, preferably less than 1000 ppm aluminum, preferably less than 500 ppm aluminum, preferably less than 100 ppm aluminum, preferably less than 50 ppm aluminum, preferably less than 20 ppm aluminum, preferably less than 5 ppm aluminum.

In a preferred embodiment, the vinyl terminated polyolefin used herein comprises at least 10 mol % (alternately at least 20 mol %, alternately at least 40 mol %, alternately at least 60 mol %) of a $C_4$ or greater olefin (such as butene, pentene, octene, nonene, decene, undecene, dodecene) and has: 1) at least 30% allyl chain ends (relative to total unsaturations), preferably at least 40%, preferably at least 50%, preferably at least 60%, preferably at least 70%, preferably at least 75%, preferably at least 80%, preferably at least 85%, preferably at least 90%, preferably at least 95% allyl chain ends (relative to total unsaturations); and 2) an Mn of from 200 to 60,000 g/mol, preferably from 200 to 50,000 g/mol, preferably from 500 to 40,000 g/mol.

In a preferred embodiment, the vinyl terminated polyolefin comprises less than 3 wt % of functional groups selected from hydroxide, aryls and substituted aryls, halogens, alkoxys, carboxylates, esters, acrylates, oxygen, nitrogen, and carboxyl, preferably less than 2 wt %, more preferably less than 1 wt %, more preferably less than 0.5 wt %, more preferably less than 0.1 wt %, more preferably 0 wt %, based upon the weight of the oligomer.

The vinyl terminated polyolefin preferably has an $M_n$ as determined by $^1$H NMR of 150 to 25,000 g/mol, 200 to 20,000 g/mol, preferably 250 to 15,000 g/mol, preferably 300 to 15,000 g/mol, preferably 400 to 12,000 g/mol, preferably 750 to 10,000 g/mol. Further, a desirable molecular weight range can be any combination of any upper molecular weight limit with any lower molecular weight limit described above. $M_n$ is determined according to the methods described below in the examples section.

The vinyl terminated polyolefin preferably has a glass transition temperature (Tg) of less than 0° C. or less (as determined by differential scanning calorimetry as described below), preferably –10° C. or less, more preferably –20° C. or less, more preferably –30° C. or less, more preferably –50° C. or less.

The vinyl terminated polyolefin preferably contains less than 80 wt % of $C_4$ olefin(s), (such as isobutylene n-butene, 2-butene, isobutylene, and butadiene), based upon the weight of the vinyl terminated polyolefin, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the vinyl terminated polyolefin.

Alternately, the vinyl terminated polyolefin preferably contains less than 20 wt % of $C_4$ or more olefin(s), (such as $C_4$ to $C_{30}$ olefins, typically such as $C_4$ to $C_{12}$ olefins, typically such as $C_4$, $C_6$, $C_8$, $C_{12}$, olefins, etc.), based upon the weight of the vinyl terminated polyolefin, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the vinyl terminated polyolefin, as determined by $^{13}$C NMR.

In another embodiment, the vinyl terminated polyolefin composition produced comprises at least 50 wt % (preferably at least 75 wt %, preferably at least 90 wt %, based upon the weight of the oligomer composition) olefins having at least 36 carbon atoms (preferably at least 51 carbon atoms, preferably at least 102 carbon atoms) as measured by $^1$H NMR assuming one unsaturation per chain.

In another embodiment, the vinyl terminated polyolefin composition produced comprises less than 20 wt % dimer and trimer (preferably less than 10 wt %, preferably less than 5 wt %, more preferably less than 2 wt %, based upon the weight of the oligomer composition), as measured by gas chromatography. Products are analyzed by gas chromatography (Agilent 6890N with auto-injector) using helium as a carrier gas at 38 cm/sec. A column having a length of 60 m (J & W Scientific DB-1, 60 m×0.25 mm I.D.×1.0 µm film thickness) packed with a flame ionization detector (FID), an Injector temperature of 250° C., and a Detector temperature of 250° C. are used. The sample was injected into the column in an oven at 70° C., then heated to 275° C. over 22 minutes (ramp rate 10° C./min to 100° C., 30° C./min to 275° C., hold). An internal standard, usually the monomer, is used to derive the amount of dimer or trimer product that is obtained. Yields of dimer and trimer product are calculated from the data recorded on the spectrometer. The amount of dimer or trimer product is calculated from the area under the relevant peak on the GC trace, relative to the internal standard.

Particularly useful vinyl terminated polyolefins may be isotactic, highly isotactic, syndiotactic, or highly syndiotactic propylene polymer, particularly isotactic polypropylene. As used herein, "isotactic" is defined as having at least 10% isotactic pentads, preferably having at least 40% isotactic pentads of methyl groups derived from propylene according to analysis by $^{13}$C NMR. As used herein, "highly isotactic" is defined as having at least 60% isotactic pentads according to analysis by $^{13}$C NMR. In a desirable embodiment, the vinyl terminated polyolefin has at least 85% isotacticity. As used herein, "syndiotactic" is defined as having at least 10% syndiotactic pentads, preferably at least 40%, according to analysis by $^{13}$C NMR. As used herein, "highly syndiotactic" is defined as having at least 60% syndiotactic pentads according to analysis by $^{13}$C NMR. In another embodiment, the vinyl terminated polyolefin has at least 85% syndiotacticity.

In another embodiment, the vinyl terminated polyolefin produced here contains less than 25 ppm hathium, preferably less than 10 ppm hafnium, preferably less than 5 ppm hafnium based on the yield of polymer produced and the mass of catalyst employed.

In another embodiment, the vinyl terminated polyolefins described herein may have a melting point (DSC first melt) of from 60° C. to 130° C., alternately 50° C. to 100° C. In another embodiment, the vinyl terminated polyolefins described herein have no detectable melting point by DSC following storage at ambient temperature (23° C.) for at least 48 hours.

Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to –80° C. The sample is held at –80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, the vinyl terminated polyolefins described herein are a liquid at 25° C.

In another embodiment, the vinyl terminated polymers (and or the functionalized multiblock polyolefins) described herein have a viscosity at 60° C. of greater than 1000 cP, greater than 12,000 cP, or greater than 100,000 cP. In other embodiments, the vinyl terminated polymers have a viscosity of less than 200,000 cP, less than 150,000 cP, or less than 100,000 cP. Viscosity is measured using a Brookfield Digital Viscometer.

In another embodiment, the vinyl terminated polyolefins described herein have an Mw (measured as described below) of 1,000 to about 30,000 g/mol, alternately 2000 to 25,000 g/mol, alternately 3,000 to 20,000 g/mol and/or an Mz of about 1700 to about 150,000 g/mol, alternately 800 to 100,000 g/mol.

Mw, Mn, Mz, number of carbon atoms, and $g'_{vis}$ are determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Vol. 34, No. 19, pp. 6812-6820, (2001) and references therein. Three Polymer Laboratories PLgel 10 mm Mixed-B LS columns are used. The nominal flow rate is 0.5 cm³/min, and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm³, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient for purposes of this invention, $A_2$=0.0006 for propylene polymers, 0.0015 for butene polymers and 0.001 otherwise, (dn/dc)=0.104 for propylene polymers, 0.098 for butene polymers and 0.1 otherwise, P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and a exponents.

Molecular weight distribution (Mw/Mn—both by GPC-DRI) is determined by the method above. In some embodiments, the vinyl terminated polyolefins of this invention have an Mw/Mn (by GPC-DRI) of 1.5 to 20, alternately 1.7 to 10.

In another embodiment, any of the vinyl terminated polyolefins described or useful herein have 3-alkyl vinyl end groups (where the alkyl is a $C_1$ to $C_{38}$ alkyl), also referred to as a "3-alkyl chain ends" or a "3-alkyl vinyl termination", represented by the formula:

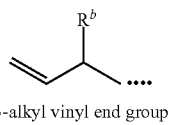

3-alkyl vinyl end group where "..." represents the polyolefin chain and $R^b$ is a $C_1$ to $C_{38}$ alkyl group, preferably a $C_1$ to $C_{20}$ alkyl group, such as methyl, ethyl, propyl, butyl, pentyl, hexyl, heptyl, octyl, nonyl, decyl, undecyl, docecyl, and the like. The amount of 3-alkyl chain ends is determined using $^{13}C$ NMR as set out below.

In a preferred embodiment, any of the vinyl terminated polyolefins described or useful herein have at least 5% 3-alkyl chain ends (preferably at least 10% 3-alkyl chain ends, at least 20% 3-alkyl chain ends, at least 30% 3-alkyl chain ends; at least 40% 3-alkyl chain ends, at least 50% 3-alkyl chain ends, at least 60% 3-alkyl chain ends, at least 70% 3-alkyl chain ends; at least 80% 3-alkyl chain ends, at least 90% 3-alkyl chain ends; at least 95% 3-alkyl chain ends, relative to total unsaturation.

In a preferred embodiment, any of the vinyl terminated polyolefins described or useful herein have at least 5% of 3-alkyl+allyl chain ends, (e.g., all 3-alkyl chain ends plus all allyl chain ends), preferably at least 10% 3-alkyl+allyl chain ends, at least 20% 3-alkyl+allyl chain ends, at least 30% 3-alkyl+allyl chain ends; at least 40% 3-alkyl+allyl chain ends, at least 50% 3-alkyl+allyl chain ends, at least 60% 3-alkyl+allyl chain ends, at least 70% 3-alkyl+allyl chain ends; at least 80% 3-alkyl+allyl chain ends, at least 90% 3-alkyl+allyl chain ends; at least 95% 3-alkyl+allyl chain ends, relative to total unsaturation.

Process to Make Vinyl Terminated Oligomers

The vinyl terminated polyolefins described above are typically prepared in a homogeneous process, preferably a bulk process as described in WO 2009/155471, which is incorporated by reference herein. In a preferred embodiment, propylene and optional comonomers (such as ethylene) can be polymerized by reacting a catalyst system (comprising metallocene compound(s) and one or more activators) with the olefins. Other additives may also be used, as desired, such as scavengers and/or hydrogen. Any conventional suspension, homogeneous bulk, solution, slurry, or high-pressure oligomerization process can be used. Such processes can be run in a batch, semi-batch, or continuous mode. Such processes and modes are well known in the art. Homogeneous polymerization processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Preferred monomers useful herein include one or more of $C_1$ to $C_{40}$ alkyls, preferably $C_1$ to $C_{40}$ (preferably $C_1$ to $C_{30}$, $C_1$ to $C_{20}$, or $C_2$ to $C_{12}$, preferably ethylene, propylene, butene, pentene, hexene, heptene, octene, nonene, decene, undecene, dodecene, norbornene, cyclopentene, cycloheptene, cyclooctene, cyclooctadiene, cyclododecene, 7-oxanorbornene, substituted derivatives thereof, and isomers thereof).

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example $C_4$ raffinate streams, and can therefore be substantially less expensive than pure 1-butene.

Suitable diluents/solvents for polymerization include non-coordinating, inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopars); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, and 1-decene. Mixtures of the foregoing are also suitable. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at less than 0.5 wt %, preferably at 0 wt % based upon the weight of the solvents.

In a preferred embodiment, the feed concentration for the polymerization is 60 volume % solvent or less, preferably 40 volume % or less, preferably 20 volume % or less. Preferably the polymerization is run in a bulk process.

Suitable additives to the polymerization process can include one or more scavengers, promoters, modifiers, reducing agents, oxidizing agents, hydrogen, aluminum alkyls, or silanes.

In a preferred embodiment, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). It has been found that in the present systems, hydrogen can be used to provide increased activity without significantly impairing the catalyst's ability to produce allylic chain ends. Preferably the catalyst activity (calculated as g/mmol catalyst/hr) is at least 20% higher than the same reaction without hydrogen present, preferably at least 50% higher, preferably at least 100% higher.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of $gPgcat^{-1} hr^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

In an alternate embodiment, the productivity at least 4500 g/mmol/hour, preferably 5000 or more g/mmol/hour, preferably 10,000 or more g/mmol/hr, preferably 50,000 or more g/mmol/hr. In an alternate embodiment, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr.

In an alternate embodiment, the activity of catalyst compound is at least 100 g/mmol/hour, preferably 1000 or more g/mmol/hour, preferably 5000 or more g/mmol/hr, preferably 10,000 or more g/mmol/hr. In an alternate embodiment, the conversion of olefin monomer is at least 10%, based upon the weight of the monomer entering the reaction zone, preferably 40% or more, preferably 60% or more, preferably 80% or more.

Preferred polymerizations can be run at typical temperatures and/or pressures, such as from 25° C. to 150° C., preferably 40° C. to 120° C., preferably 45° C. to 80° C., and preferably from 0.35 to 10 MPa, preferably from 0.45 to 6 MPa, preferably from 0.5 to 4 MPa.

In a typical polymerization, the residence time of the reaction is up to 60 minutes, preferably between 5 to 50 minutes, preferably 10 to 40 minutes.

In a preferred embodiment, little or no alumoxane is used in the process to produce the vinyl terminated polyolefins. Preferably, alumoxane is present at zero mol %, alternately the alumoxane is present at a molar ratio of aluminum to transition metal less than 500:1, preferably less than 300:1, preferably less than 100:1, preferably less than 1:1.

In an alternate embodiment, if an alumoxane is used to produce the vinyl terminated polyolefins then, the alumoxane has been treated to remove free alkyl aluminum compounds, particularly trimethyl aluminum.

Further, in a preferred embodiment, the activator used herein to produce the vinyl terminated polyolefin is bulky as defined herein and is discrete.

In a preferred embodiment, little or no scavenger (such as trialkyl aluminum) is used in the process to produce the vinyl terminated polyolefins. Preferably, scavenger is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0° C. to 300° C. (preferably 25° C. to 150° C., preferably 40° C. to 120° C., preferably 45° C. to 80° C.); and 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are present in the solvent at less than 1 wt %, preferably at less than 0.5 wt %, preferably at 0 wt % based upon the weight of the solvents); 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1); 5) the polymerization occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally, hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Catalyst Compound to Make Vinyl Terminated Oligomers

A "catalyst system" is combination of at least one catalyst compound, at least one activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, or a transition metal compound, and these terms are used interchangeably. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties. This includes other π-bound moieties such as indenyls or fluorenyls or derivatives thereof.

Catalyst compounds useful herein to produce the vinyl terminated oligomers include one or more metallocene compound(s) represented by the formulae:

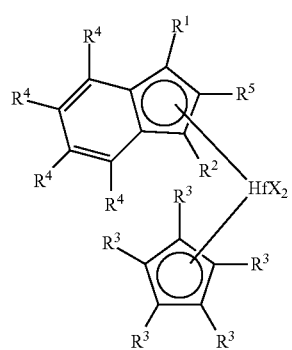

I

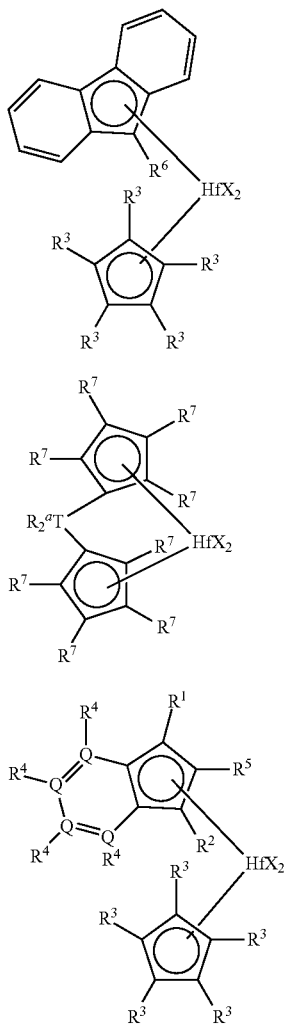

where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);
each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);
each $R^1$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl, or octyl, $R^1$ may the same or different as $R^2$;
each $R^2$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl, or octyl, provided that at least one of $R^1$ or $R^2$ is not hydrogen, preferably both of $R^1$ and $R^2$ are not hydrogen, preferably $R^1$ and/or $R^2$ are not branched;
each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided, however, that at least three $R^3$ groups are not hydrogen (alternately four $R^3$ groups are not hydrogen, alternately five $R^3$ groups are not hydrogen); {Alternately, when the catalyst compound is to used to make the homo-oligomer then each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl; or 2) four $R^3$ groups are not hydrogen and at least one $R^3$ group is a $C_2$ to $C_8$ substituted or unsubstituted hydrocarbyl (preferably at least two, three, four, or five $R^3$ groups are a $C_2$ to $C_8$ substituted or unsubstituted hydrocarbyl)};
each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);
$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;
$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;
each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl, or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);
N is nitrogen;
T is a bridge, preferably, Si or Ge, preferably Si;
each $R^a$, is independently, hydrogen, halogen or a $C_1$ to $C_{20}$ hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated.

In an alternate embodiment, at least one $R^4$ group is not hydrogen, alternately at least two $R^4$ groups are not hydrogen, alternately at least three $R^4$ groups are not hydrogen, alternately at least four $R^4$ groups are not hydrogen, alternately all $R^4$ groups are not hydrogen.

Catalyst compounds that are particularly useful in this invention include one or more of:
(1,3-Dimethylindenyl)(pentamethylcyclopentadienyl)hafniumdimethyl,
(1,3,4,7-Tetramethylindenyl)(pentamethylcyclopentadienyl) hafniumdimethyl,
(1,3-Dimethylindenyl)(tetramethylcyclopentadienyl)hafniumdimethyl, (1,3-Diethylindenyl)(pentamethylcyclopentadienyl)hafniumdimethyl,
(1,3-Dipropylindenyl)(pentamethylcyclopentadienyl)hafniumdimethyl,
(1-Methyl,3-propyllindenyl)(pentamethylcyclopentadienyl) hafniumdimethyl,
(1,3-Dimethylindenyl)(tetramethylpropylcyclopentadienyl) hafniumdimethyl,
(1,2,3-Trimethylindenyl)(pentamethylcyclopentadienyl) hafniumdimethyl,
(1,3-Dimethylbenzindenyl)(pentamethylcyclopentadienyl) hafniumdimethyl,
(2,7-Bis t-butylfluorenyl)(pentamethylcyclopentadienyl) hafniumdimethyl,
(9-Methylfluorenyl)(pentamethylcyclopentadienyl)hafniumdimethyl,
(2,7,9-Trimethylfluorenyl)(pentamethylcyclopentadienyl) hafniumdimethyl,
μ-Dihydrosilyl-bis(tetramethylcyclopentadienyl)hafniumdimethyl,
μ-Dimethylsilyktetramethylcyclopentadienyl)(3-propyltrimethylcyclopentadienyl) hafniumdimethyl, and
μ-D icyclopropylsilyl(bis tetramethylcyclopentadienyl) hafniumdimethyl.

In another embodiment, the vinyl terminated polyolefins useful here in may be produced using the catalyst compound represented by the formula:

where M is hafnium or zirconium (preferably hafnium); each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably each X is independently selected from halides and $C_1$ to $C_5$ alkyl groups, preferably each X is a methyl group); each $R^8$ is, independently, a $C_1$ to $C_{10}$ alkyl group (preferably methyl, ethyl, propyl, butyl, pentyl, hexyl, or isomers thereof, preferably each $R^8$ is a methyl group); each $R^9$ is, independently, a $C_1$ to $C_{10}$ alkyl group (preferably methyl, ethyl, propyl, butyl, pentyl, hexyl, or isomers thereof, preferably each $R^9$ is a n-propyl group); each $R^{10}$ is hydrogen; each $R^{11}$, $R^{12}$, and $R^{13}$, is, independently, hydrogen or a substituted or unsubstituted hydrocarbyl group, a heteroatom or heteroatom containing group (preferably hydrogen); T is a bridging group (preferably T is dialkyl silicon or dialkyl germanium, preferably T is dimethyl silicon); and further provided that any of adjacent $R^{11}$, $R^{12}$, and $R^{13}$ groups may form a fused ring or multicenter fused ring system where the rings may be aromatic, partially saturated or saturated. For further information on such catalyst compounds and their use to make vinyl terminated polyolefins, please see concurrently filed U.S. Ser. No. 13/072,280, filed Mar. 25, 2011, and entitled "Novel Catalysts and Methods of Use Thereof to Produce Vinyl Terminated Polymers".

Catalyst compounds that are particularly useful in this invention include one or more of:
rac-dimethylsilyl bis(2-methyl,3-propylindenyl)hafniumdimethyl,
rac-dimethylsilyl bis(2-methyl,3-propylindenyl)zirconiumdimethyl,
rac-dimethylsilyl bis(2-ethyl,3-propylindenyl)hafniumdimethyl;
rac-dimethylsilyl bis(2-ethyl,3-propylindenyl)zirconiumdimethyl,
rac-dimethylsilyl bis(2-methyl,3-ethylindenyl)hafniumdimethyl,
rac-dimethylsilyl bis(2-methyl,3-ethylindenyl)zirconiumdimethyl,
rac-dimethylsilyl bis(2-methyl,3-isopropylindenyl)hafniumdimethyl,
rac-dimethylsilyl bis(2-methyl,3-isopropylindenyl)zirconiumdimethyl,
rac-dimethylsilyl bis(2-methyl,3-butyllindenyl)hathiumdimethyl,
rac-dimethylsilyl bis(2-methyl,3-butylindenyl)zirconiumdimethyl,
rac-dimethylgermanyl bis(2-methyl,3-propylindenyl)hathiumdimethyl,
rac-dimethylgermanyl bis(2-methyl,3-propylindenyl)zirconiumdimethyl,
rac-dimethylgermanyl bis(2-ethyl,3-propylindenyl)hafniumdimethyl,
rac-dimethylgermanyl bis(2-ethyl,3-propylindenyl)zirconiumdimethyl,
rac-dimethylgermanyl bis(2-methyl,3-ethylindenyl)hafniumdimethyl,
rac-dimethylgermanyl bis(2-methyl,3-ethylindenyl)zirconiumdimethyl,
rac-dimethylgermanyl bis(2-methyl,3-isopropylindenyl) hafniumdimethyl,
rac-dimethylgermanyl bis(2-methyl,3-isopropylindenyl)zirconiumdimethyl,
rac-dimethylgermanyl bis(2-methyl,3-butyllindenyl)hafniumdimethyl,
rac-dimethylgermanyl bis(2-methyl,3-propylindenyl)zirconiumdimethyl,
rac-dimethylsilyl bis(2-propyl,3-methylindenyl)hathiumdimethyl,
rac-dimethylsilyl bis(2-propyl,3-methylindenyl)zirconiumdimethyl,
rac-dimethylsilyl bis(2-propyl,3-ethylindenyl)hafniumdimethyl,
rac-dimethylsilyl bis(2-propyl,3-ethylindenyl)zirconiumdimethyl,
rac-dimethylsilylbis(2-propyl,3-butylindenyl)hafniumdimethyl,
rac-dimethylsilylbis(2-propyl,3-butylindenyl)zirconiumdimethyl,
rac-dimethylsilyl bis(2-methyl,3-butylindenyl)hafniumdimethyl,
rac-dimethylsilyl bis(2-methyl,3-butylindenyl)zirconiumdimethyl,
rac-dimethylsilyl bis(2,3-dimethyl)hathiumdimethyl,
rac-dimethylsilyl bis(2,3-dimethyl)zirconiumdimethyl,
rac-dimethylgermanyl bis(2-propyl,3-methylindenyl)hafniumdimethyl,
rac-dimethylgermanyl bis(2-propyl,3-methylindenyl)zirconiumdimethyl,
rac-dimethylgermanyl bis(2-propyl,3-ethylindenyl)hafniumdimethyl, rac-dimethylgermanyl bis(2-propyl,3-ethylindenyl)zirconiumdimethyl,
rac-dimethylgermanyl bis(2-propyl,3-butylindenyl)hafniumdimethyl,
rac-dimethylgermanyl bis(2-propyl,3-butylindenyl)zirconiumdimethyl,
rac-dimethylgermanyl bis(2-methyl,3-butylindenyl)hafniumdimethyl,
rac-dimethylgermanyl bis(2-methyl,3-butylindenyl)zirconiumdimethyl,
rac-dimethylgermanyl bis(2,3-dimethyl)hafniumdimethyl, and
rac-dimethylgermanyl bis(2,3-dimethyl)zirconiumdimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

In particular embodiments, the catalyst compound is rac-dimethylsilylbis(2-methyl,3-propylindenyl)hafniumdimethyl or dichloride, or rac-dimethylsilylbis(2-methyl,3-propylindenyl)zirconiumdimethyl or dichloride.

Preferred activators useful with the above include: dimethylaniliniumtetrakis(pentafluorophenyl) borate, dimethylaniliniumtetrakis(heptafluoronaphthyl) borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, and [4-t-butyl-PhNMe$_2$H][(C$_6$F$_3$(C$_6$F$_5$)$_2$)$_4$B] (where Ph is phenyl and Me is methyl).

Preferred combinations of catalyst and activator include: N,N-dimethylanilinium tetrakis(perfluorobiphenyl)borate and rac-dimethylsilylbis(2-methyl,3-propylindenyl)hafniumdimethyl, or rac-dimethylsilylbis(2-methyl,3-propylindenyl)zirconiumdimethyl.

In another embodiment, the vinyl terminated polyolefins useful here in may be produced using the catalyst compound represented by the formula:

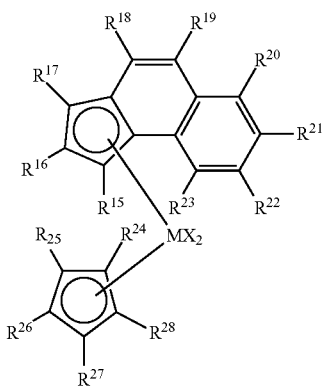

wherein M is hafnium or zirconium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof; each $R^{15}$ and $R^{17}$ are, independently, a $C_1$ to $C_8$ alkyl group (preferably a $C_1$ to $C_8$ linear alkyl group, preferably methyl ethyl, propyl, butyl, pentyl, hexyl, heptyl, or octyl); and each $R^{16}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are, independently, hydrogen, or a substituted or unsubstituted hydrocarbyl group having from 1 to 8 carbon atoms (preferably 1 to 6 carbon atoms, preferably a substituted or unsubstituted $C_1$ to $C_8$ linear alkyl group, preferably methyl ethyl, propyl, butyl, pentyl, hexyl, heptyl, octyl). In a preferred embodiment, at least three of $R^{24}$-$R^{28}$ groups are not hydrogen (alternately four of $R^{24}$-$R^{28}$ groups are not hydrogen, alternately five of $R^{24}$-$R^{28}$ groups are not hydrogen). In a preferred embodiment, all five groups of $R^{24}$-$R^{28}$ are methyl. In a preferred embodiment, four of the $R^{24}$-$R^{28}$ groups are not hydrogen and at least one of the $R^{24}$-$R^{28}$ groups is a $C_2$ to $C_8$ substituted or unsubstituted hydrocarbyl (preferably at least two, three, four or five of $R^{24}$-$R^{28}$ groups are a $C_2$ to $C_8$ substituted or unsubstituted hydrocarbyl). In another preferred embodiment, $R^{15}$ and $R^{17}$ are methyl groups, $R^{16}$ is a hydrogen, $R^{18}$-$R^{23}$ are all hydrogens, $R^{24}$-$R^{28}$ are all methyl groups, and each X is a methyl group. For further information on such catalyst compounds and their use to make vinyl terminated polyolefins, please see concurrently filed U.S. Ser. No. 13/072,279, filed Mar. 25, 2011, and entitled "Enhanced Catalyst Performance for Production of Vinyl Terminated Propylene and Ethylene/Propylene Macromers."

Catalyst compounds that are particularly useful in this invention include (CpMe$_5$)(1,3-Me$_2$-benz[e]indenyl)HfMe$_2$, (CpMe$_5$)(1-methyl-3-n-propylbenz[e]indenyl)HfMe$_2$, (CpMe$_5$)(1-n-propyl,3-methylbenz[e]indenyl)HfMe$_2$, (CpMe$_5$)(1-methyl-3-n-butylbenz[e]indenyl)HfMe$_2$, (CpMe$_5$)(1-n-butyl,3-methylbenz[e]indenyl)HfMe$_2$, (CpMe$_5$)(1-ethyl,3-methylbenz[e]indenyl)HfMe$_2$, (CpMe$_5$)(1-methyl, 3-ethylbenz[e]indenyl)HfMe$_2$, (CpMe$_4$n-propyl)(1,3-Me$_2$-benz[e]indenyl)HfMe$_2$, (CpMe$_4$-n-propyl)(1-methyl-3-n-propylbenz[e]indenyl)HfMe$_2$, (CpMe$_4$-n-propyl)(1-n-propyl,3-methylbenz[e]indenyl)HfMe$_2$, (CpMe$_4$-n-propyl)(1-methyl-3-n-butylbenz[e]indenyl)HfMe$_2$, (CpMe$_4$-n-propyl)(1-n-butyl,3-methylbenz[e]indenyl)HfMe$_2$, (CpMe$_4$-n-propyl)(1-ethyl,3-methylbenz[e]indenyl)HfMe$_2$, (CpMe$_4$-n-propyl)(1-methyl, 3-ethylbenz[e]indenyl)HfMe$_2$, (CpMe$_4$n-butyl)(1,3-Me$_2$-benz[e]indenyl)HfMe$_2$, (CpMe$_4$n-butyl)(1-methyl-3-n-propylbenz[e]indenyl)HfMe$_2$, (CpMe$_4$n-butyl)(1-n-propyl,3-methylbenz[e]indenyl)HfMe$_2$, (CpMe$_4$n-butyl)(1-methyl-3-n-butylbenz[e]indenyl)HfMe$_2$, (CpMe$_4$n-butyl)(1-n-butyl,3-methylbenz[e]indenyl)HfMe$_2$, (CpMe$_4$n-butyl)(1-ethyl,3-methylbenz[e]indenyl)HfMe$_2$, (CpMe$_4$n-butyl)(1-methyl, 3-ethylbenz[e]indenyl)HfMe$_2$, and the zirconium analogs thereof.

In an alternate embodiment, the "dimethyl" (Me$_2$) after the transition metal in the list of catalyst compounds above is replaced with a dihalide (such as dichloride or difluoride) or a bisphenoxide, particularly for use with an alumoxane activator.

Other activators useful with the above catalysts include: dimethylaniliniumtetrakis(pentafluorophenyl) borate, dimethylaniliniumtetrakis(heptafluoronaphthyl) borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-diethylanilinium tetrakis(perfluorobiphenyl)borate, N,N-dimethyl-(2,4,6-trimethylanilinium)tetrakis (perfluorobiphenyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium)tetrakis (perfluorobiphenyl)borate, [4-t-butyl-PhNMe$_2$H][(C$_6$F$_3$(C$_6$F$_5$)$_2$)$_4$B].

In a preferred embodiment the branched polymers described herein may be produced as described in concurrently filed U.S. Ser. No. 61/467,681, filed Mar. 25, 2011, entitled "Branched Vinyl Terminated Polymers and Methods for Production Thereof".

Activators and Activation Methods for Catalyst Compounds to Make Vinyl Terminated Polymers The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al(R$^1$)—O— sub-units, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio. Alternate preferred ranges include up to 500:1, alternately up to 200:1, alternately up to 100:1, alternately from 1:1 to 50:1.

Aluminum alkyl or organoaluminum compounds which may be utilized as co-activators (or scavengers) include trimethylaluminum, triethylaluminum, triisobutylaluminum, tri-n-hexylaluminum, tri-n-octylaluminum, and the like.

Ionizing Activators

It is within the scope of this invention to use an ionizing or stoichiometric activator, neutral or ionic, such as tri(n-butyl) ammonium tetrakis(pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators. More preferred activators include the ionic activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl, or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Ionic catalysts can be preparedly reacting a transition metal compound with some neutral Lewis acids, such as B(C$_6$F$_6$)$_3$, which upon reaction with the hydrolyzable ligand (X) of the transition metal compound forms an anion, such as ([B(C$_6$F$_5$)$_3$(X)]$^-$), which stabilizes the cationic transition metal species generated by the reaction. The catalysts can be, and preferably are, prepared with activator components which are ionic compounds or compositions.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases such as ethers, amines, and the like. Two classes of compatible non-coordinating anions have been disclosed in EP 0 277,003 A and EP 0 277,004 A, published 1988: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes and boranes.

In a preferred embodiment, the stoichiometric activators include a cation and an anion component, and may be represented by the following formula:

$$(L-H)_d^+(A^{d-}) \tag{14}$$

wherein L is an neutral Lewis base; H is hydrogen; (L-H)$^+$ is a Bronsted acid; A$^{d-}$ is a non-coordinating anion having the charge d−; and d is an integer from 1 to 3.

The cation component, (L-H)$_d^+$ may include Bronsted acids such as protonated Lewis bases capable of protonating a moiety, such as an alkyl or aryl, from the bulky ligand metallocene containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

The anion component $A^{d-}$ include those having the formula $[M^{k+}Q_n]^{d-}$ wherein k is an integer from 1 to 3; n is an integer from 2 to 6; n−k=d; M is an element selected from Group 13 of the Periodic Table of the Elements, preferably boron or aluminum; and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate, triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, dialkyl ammonium salts, such as: di-(i-propyl)ammonium tetrakis(pentafluorophenyl)borate, dicyclohexylammonium tetrakis(pentafluorophenyl)borate, and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator $(L-H)_d^+$ $(A^{d-})$ is N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

In one embodiment, an activation method using ionizing ionic compounds not containing an active proton but capable of producing a bulky ligand metallocene catalyst cation and their non-coordinating anion are also contemplated, and are described in EP 0 426 637 A; EP 0 573 403 A; and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. In addition to these activator compounds or co-catalysts, scavengers are used, such as tri-isobutyl aluminum or tri-octyl aluminum.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP 0 427 697 A and EP 0 520 732 A for illustrations of analogous Group-4 metallocene compounds. Also, see the methods and compounds of EP 0 495 375 A. For formation of zwitterionic complexes using analogous Group 4 compounds, see U.S. Pat. Nos. 5,624,878; 5,486,632; and 5,527,929.

Another suitable ion forming, activating cocatalyst comprises a salt of a cationic oxidizing agent and a noncoordinating, compatible anion represented by the formula:

$$(OX^{e+})_d(A^{d-})_e \tag{16}$$

wherein OX$e$+ is a cationic oxidizing agent having a charge of e+; e is an integer from 1 to 3; and A$^-$, and d are as previously defined. Examples of cationic oxidizing agents include: ferrocenium, hydrocarbyl-substituted ferrocenium, Ag$^+$, or Pb$^{+2}$. Preferred embodiments of A$^{d-}$ are those anions previously defined with respect to the Bronsted acid containing activators, especially tetrakis(pentafluorophenyl)borate.

The typical activator-to-catalyst-precursor ratio when the activator is not analumoxane is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Particularly useful activators include bulky activators. "Bulky activator" as used herein refers to anionic activators represented by the formula:

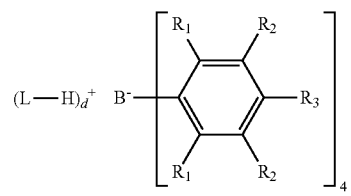

where:
each R$_1$ is, independently, a halide, preferably a fluoride;
each R$_2$ is, independently, a halide, a C$_6$ to C$_{20}$ substituted aromatic hydrocarbyl group or a siloxy group of the formula —O—S$_1$—R$_a$, where R$_a$ is a C$_1$ to C$_{20}$ hydrocarbyl or hydrocarbylsilyl group (preferably R$_2$ is a fluoride or a perfluorinated phenyl group);
each R$_3$ is a halide, C$_6$ to C$_{20}$ substituted aromatic hydrocarbyl group or a siloxy group of the formula —O—S$_1$—R$_a$, where R$_a$ is a C$_1$ to C$_{20}$ hydrocarbyl or hydrocarbylsilyl group (preferably R$_3$ is a fluoride or a C$_6$ perfluorinated aromatic hydrocarbyl group); wherein R$_2$ and R$_3$ can form one or more saturated or unsaturated, substituted or unsubstituted rings (preferably R$_2$ and R$_3$ form a perfluorinated phenyl ring);
L is an neutral Lewis base;
(L-H)$^+$ is a Bronsted acid;
d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3V$_s$, where V$_s$ is the scaled volume. V$_s$ is the sum of the relative volumes of the constituent atoms, and is calculated from the molecular formula of the substituent using the following table of relative volumes. For fused rings, the V$_s$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_S$ | MV Per Per subst. (Å³) | Total MV (Å³) |
|---|---|---|---|---|---|
| Dimethylanilinium tetrakis (perfluoronaphthyl) borate | [perfluoronaphthyl]₄ | $C_{10}F_7$ | 34 | 261 | 1044 |
| Dimethylanilinium tetrakis (perfluorobiphenyl) borate | [perfluorobiphenyl]₄ | $C_{12}F_9$ | 42 | 349 | 1396 |
| [4-tButyl-PhNMe₂H] [(C₆F₃(C₆F₅)₂)₄B] | [perfluoro-tri-phenyl]₄ | $C_{18}F_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-t-butyl-PhNMe₂H][(C₆F₃(C₆F₅)₂)₄B], and the types disclosed in U.S. Pat. No. 7,297,653.

Activator Combinations

It is within the scope of this invention that catalyst compounds can be combined with one or more activators or activation methods described above. For example, a combination of activators have been described in U.S. Pat. Nos. 5,153,157; 5,453,410; European publication EP 0 573 120 B1; PCT publications WO 94/07928; and WO 95/14044. These documents all discuss the use of an alumoxane in combination with an ionizing activator.

Support Materials

In embodiments herein, the catalyst system used to make the vinyl terminated polyolefins may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 μm. Most preferably the surface area of the support material is in the range is from about 100 to about 400 $m^2/g$, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$), examples of which are marketed under the tradenames of DAVISON 952 or DAVISON 955 by the Davison Chemical Division of W.R. Grace and Company. In other embodiments, DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce the catalyst system of this invention. The calcined support material is then contacted with at least one polymerization catalyst comprising at least one metallocene compound and an activator.

Methods of Making the Supported Catalyst Systems

The support material, having reactive surface groups, typically hydroxyl groups, is slurried in a non-polar solvent and the resulting slurry is contacted with a solution of a metallocene compound and an activator. The slurry of the support material in the solvent is prepared by introducing the support material into the solvent, and heating the mixture to about 0° C. to about 70° C., preferably to about 25° C. to about 60° C., preferably at room temperature. Contact times typically range from about 0.5 hours to about 24 hours, from about 0.5 hours to about 8 hours, or from about 0.5 hours to about 4 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene and ethylbenzene, may also be employed.

In embodiments herein, the support material is contacted with a solution of a metallocene compound and an activator, such that the reactive groups on the support material are titrated, to form a supported polymerization catalyst. The period of time for contact between the metallocene compound, the activator, and the support material is as long as is necessary to titrate the reactive groups on the support material. To "titrate" is meant to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the metallocene compound and an activator: the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.7 millimoles per gram (mmols/gm) is typically achieved. Thus, the exact molar ratio of the activator to the surface reactive groups on the carrier will vary. Preferably, this is determined on a case-by-case basis to assure that only so much of the activator is added to the solution as will be deposited onto the support material without leaving excess of the activator in the solution.

The amount of the activator which will be deposited onto the support material without leaving excess in the solution can be determined in any conventional manner, e.g., by adding the activator to the slurry of the carrier in the solvent, while stirring the slurry, until the activator is detected as a solution in the solvent by any technique known in the art, such as by $^1$H NMR. For example, for the silica support material heated at about 600° C., the amount of the activator added to the slurry is such that the molar ratio of B to the hydroxyl groups (OH) on the silica is about 0.5:1 to about 4:1, preferably about 0.8:1 to about 3:1, more preferably about 0.9:1 to about 2:1 and most preferably about 1:1. The amount of boron on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, Eds., Butterworth-Heinemann, Boston, Mass., 1992, pp. 633-644. In another embodiment, it is also possible to add such an amount of activator which is in excess of that which will be deposited onto the support, and then remove, e.g., by filtration and washing, any excess of the activator.

The following paragraphs provide for various aspects of the present invention.

1. A composition comprising a functionalized multiblock polyolefin represented by the formula (X) or (XX):

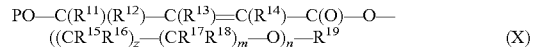

(X)

or

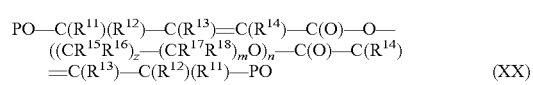

(XX)

wherein $R^{11}$, $R^{12}$, $R^{13}$, and $R^{14}$ are each independently a substituted or unsubstituted $C_1$ through $C_4$ hydrocarbyl group (preferably substituted or unsubstituted methyl, ethyl, propyl, butyl and isomers thereof) or a hydrogen;

$R^{15}$, $R^{16}$, $R^{17}$, and $R^{18}$ are each independently a substituted or unsubstituted $C_1$ through $C_4$ hydrocarbyl group (preferably substituted or unsubstituted methyl, ethyl, propyl, butyl, and isomers thereof) or a hydrogen;

$R^{19}$ is a $C_1$ to a $C_{20}$ substituted or unsubstituted hydrocarbyl group (preferably substituted or unsubstituted methyl, ethyl, propyl, butyl, pentyl, hexyl, heptyl, octyl, nonyl, decyl, docecyl and isomers thereof), or a hydrogen;

z is ≥1 to about 5, preferably 2, 3, 4, or 5;

m is ≥1 to about 5, preferably 2, 3, 4, or 5;

PO is a polyolefin hydrocarbyl group comprising 10 to 4000 carbon atoms (preferably 15 to 3500, preferably 100 to 2500; and n is from 1 to about 10,000, preferably 2 to 1000, preferably 3 to 500, preferably 4 to 300, preferably 4 to 150, preferably 4 to 50, preferably 4 to 20.

2. The functionalized multiblock polyolefin of paragraph 1, wherein $R^{11}$, $R^{12}$, $R^{13}$, $R^{14}$, $R^{15}$, $R^{16}$, $R^{17}$, and $R^{18}$ are each hydrogen atoms and $R^{19}$ is a hydrogen, a methyl, or an ethyl group.

3. The functionalized multiblock polyolefin of either of paragraphs 1 or 2, wherein z is 1, m is 1, and n is from 2 to about 1000.

4. The functionalized multiblock polyolefin of either of paragraphs 1 or 2, wherein z is 2, m is 1, and n is from 2 to about 1000.

5. The functionalized multiblock polyolefin of either of paragraphs 1 or 2, wherein z is 2, m is 2, and n is from 2 to about 1000.

6. The functionalized multiblock polyolefin of any of paragraphs 1 through 5, wherein:
a) $R^{11}$ through $R^{14}$ are all hydrogens and one of $R^{15}$ through $R^{18}$ is a $C_1$-$C_6$ hydrocarbon: or
b) $R^{12}$ through $R^{18}$ comprise six hydrogens and one $C_1$-$C_6$ hydrocarbon; or
c) $R^{12}$ through $R^{18}$ comprise six hydrogens and one methyl group.

7. The functionalized multiblock polyolefin of any of paragraphs 1 through 6, wherein the functionalized multiblock polyolefin is amphiphilic, preferably n is greater than 1, preferably from 1 to 100, and PO is a hydrocarbyl or a substituted hydrocarbyl, provided that if PO is a substituted hydrocarbyl, then PO is not water soluble, preferably, one of "$(CR^{17}R^{18})_m$—O)$_n$" or PO in Formula (X) or (XX) is hydrophobic and the other is hydrophilic.

8. A process to prepare the functionalized multiblock polyolefin of any of paragraphs 1 to 7 comprising contacting: 1) an alkene metathesis catalyst, 2) an acrylate or methacrylate functionalized polyalkylene glycol represented by the formula (XII) or (XXII):

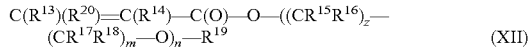

(XII)

or

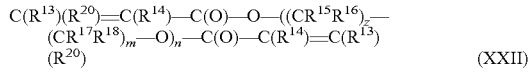

(XXII)

wherein $R^{13}$, $R^{14}$, $R^{15}$, $R^{16}$, $R^{17}$, $R^{18}$, $R^{19}$, z, m, and n are as defined above in paragraph 1;

$R^{20}$ is a hydrogen or a $C_1$ to a $C_4$ substituted or unsubstituted hydrocarbyl group (preferably substituted or unsubstituted methyl, ethyl, propyl, butyl and isomers thereof); and 3) a vinyl terminated polyolefin, preferably containing at least 5% allyl chain ends, relative to total unsaturation.

9. The process of paragraph 8, wherein the vinyl terminated polyolefin is one or more of: a) a propylene co-oligomer having an Mn of 300 to 30,000 g/mol (as measured by $^1$H NMR) comprising 10 to 90 mol % propylene and 10 to 90 mol % of ethylene, wherein the oligomer has at least X % allyl chain ends (relative to total unsaturations), where: 1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83* (mol % ethylene incorporated)−83), when 70 to 90 mol % ethylene is present in the co-oligomer; and/or b) a propylene oligomer, comprising more than 90 mol % propylene and less than 10 mol % ethylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.35:1.0, and less than 1400 ppm aluminum; and/or c) a propylene oligomer, comprising at least 50 mol % propylene and from 10 to 50 mol % ethylene, wherein the oligomer has: at least 90% allyl chain ends, Mn of about 150 to about 10,000 g/mol (as measured by $^1$H NMR), and an isobutyl chain end to allylic vinyl group ratio of 0.8:1 to 1.3:1.0, wherein monomers having four or more carbon atoms are present at from 0 to 3 mol %; and/or d) a propylene oligomer, comprising at least 50 mol % propylene, from 0.1 to 45 mol % ethylene, and from 0.1 to 5 mol % $C_4$ to $C_{12}$ olefin, wherein the oligomer has: at least 87% allyl chain ends (alternately at least 90%), an Mn of about 150 to about 10,000 g/mol, (as measured by $^1$H NMR), and an isobutyl chain end to allylic vinyl group ratio of 0.8:1 to 1.35:1.0; and/or e) a propylene oligomer, comprising at least 50 mol % propylene, from 0.1 to 45 mol % ethylene, and from 0.1 to 5 mol % diene, wherein the oligomer has: at least 90% allyl chain ends, an Mn of about 150 to about 10,000 g/mol (as measured by $^1$H NMR), and an isobutyl chain end to allylic vinyl group ratio of 0.7:1 to 1.35:1.0; and/or f) a homooligomer, comprising propylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.2:1.0, and less than 1400 ppm aluminum; and/or g) a branched polyolefin having an Mn ($^1$H NMR) of 7,500 to 60,000 g/mol comprising: (i) one or more alpha olefin derived units selected from the group consisting of ethylene and propylene; (ii) 50% or greater allyl chain ends, relative to total number of unsaturated chain ends; and (iii) a g'(vis) of 0.90 or less; and/or h) branched polyolefins having an Mn greater than 60,000 g/mol comprising: (i) one or more alpha olefins selected from the group consisting of ethylene and propylene; (ii) 50% or greater allyl chain ends, relative to total unsaturated chain ends; (iii) a g'(vis) of 0.90 or less; and (iv) a bromine number which, upon complete hydrogenation, decreases by at least 50%; and/or i) a branched polyolefins having an Mn of less than 7,500 g/mol comprising: (i) one or more alpha olefin derived units selected from the group consisting of ethylene and propylene; (ii) a ratio of percentage of saturated chain ends to percentage of allyl chain ends of 1.2 to 2.0; and (iii) 50% or greater allyl chain ends, relative to total moles of unsaturated chain ends; and/or j) vinyl terminated higher olefin copolymers having an Mn (measured by $^1$H NMR) of 300 g/mol or greater (preferably 300 to 60,000 g/mol) comprising: (i) from about 20 to 99.9 mol % of at least one $C_5$ to $C_{40}$ higher olefin; and (ii) from about 0.1 to 80 mol % of propylene; wherein the higher olefin copolymer has at least 40% allyl chain ends; and/or k) vinyl terminated higher olefin copolymers having an Mn (measured by $^1$H NMR) of 300 g/mol or greater (preferably 300 to 60,000 g/mol) comprising: (i) from about 80 to 99.9 mol % of at least one $C_4$ olefin; and (ii) from about 0.1 to 20 mol % of propylene; wherein the higher olefin copolymer has at least 40% allyl chain ends; and/or l) a higher olefin polymer having an Mn (measured by $^1$H NMR) of at least 200 g/mol comprising of one or more $C_4$ to $C_{40}$ higher olefin derived units, where the higher olefin vinyl terminated polymer comprises substantially no propylene derived units; and wherein the higher olefin polymer has at least 5% allyl chain ends.

10. The process of paragraph 8 or 9, wherein PO has an Mn of 300 to 30,000 g/mol (as measured by $^1$H NMR) comprising 10 to 90 mol % propylene and 10 to 90 mol % of ethylene, and is derived from a vinyl terminated polyolefin is a polymer that has at least X % allyl chain ends (relative to total unsaturations), where: 1) X=(-0.94 (mol % ethylene incorporated)+100), when 10 to 60 mol % ethylene is present in the polymer; 2) X=45, when greater than 60 and less than 70 mol % ethylene is present in the polymer; and 3) X=(1.83* (mol % ethylene incorporated)-83), when 70 to 90 mol % ethylene is present in the polymer.

11. The process of either paragraphs 8, 9, or 10, wherein the vinyl terminated polyolefin has more than 90% allyl chain ends (relative to total unsaturations).

12. The process of either paragraphs 8 or 9, wherein the vinyl terminated polyolefin comprises 15 wt % to 95 wt % ethylene and has more than 80% allyl chain ends (relative to total unsaturations).

13. The process of either paragraphs 8 or 9, wherein the vinyl terminated polyolefin comprises 30 wt % to 95 wt % ethylene and has more than 70% allyl chain ends (relative to total unsaturations).

14. The process of either paragraphs 8 or 9, wherein the vinyl terminated polyolefin comprises 30 wt % to 95 wt % ethylene and has more than 90% allyl chain ends (relative to total unsaturations).

15. The process of either paragraphs 8 or 9, wherein the vinyl terminated polyolefin comprises a propylene oligomer comprising more than 90 mol % propylene and less than 10 mol % ethylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.35:1.0, and less than 1400 ppm aluminum.

16. The process of either paragraphs 8 or 9, wherein the vinyl terminated polyolefin comprises a propylene oligomer comprising at least 50 mol % propylene and from 10 to 50 mol % ethylene, wherein the oligomer has: at least 90% allyl chain ends, Mn of about 150 to about 10,000 g/mol (as measured by $^1$H NMR), and an isobutyl chain end to allylic vinyl group ratio of 0.8:1 to 1.3:1.0, wherein monomers having four or more carbon atoms are present at from 0 to 3 mol %.

17. The process of either paragraphs 8 or 9, wherein the vinyl terminated polyolefin comprises a propylene oligomer comprising at least 50 mol % propylene, from 0.1 to 45 mol % ethylene, and from 0.1 to 5 mol % $C_4$ to $C_{12}$ olefin, wherein the oligomer has: at least 87% allyl chain ends (alternately at least 90%), an Mn of about 150 to about 10,000 g/mol, (as measured by $^1$H NMR), and an isobutyl chain end to allylic vinyl group ratio of 0.8:1 to 1.35:1.0.

18. The process of either paragraphs 8 or 9, wherein the vinyl terminated polyolefin comprises a propylene oligomer comprising at least 50 mol % propylene, from 0.1 to 45 mol % ethylene, and from 0.1 to 5 mol % diene, wherein the oligomer has: at least 90% allyl chain ends, an Mn of about 150 to about 10,000 g/mol (as measured by $^1$H NMR), and an isobutyl chain end to allylic vinyl group ratio of 0.7:1 to 1.35:1.0.

19. The process of either paragraphs 8 or 9, wherein the vinyl terminated polyolefin comprises a homooligomer comprising propylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.2:1.0, and less than 1400 ppm aluminum.

20. The process of any of paragraphs 8 through 19, wherein the vinyl terminated polyolefin is a liquid at 25° C. and/or has a Brookfield viscosity at 60° C. of greater than 1000 cP, greater than 12,000 cP, or greater than 100,000 cP and preferably less than 200,000 cP, less than 150,000 cP, or less than 100,000 cP.

21. The process of any of paragraphs 8 through 20, wherein the Mn of the vinyl terminated polyolefin is about 500 to about 7,500 g/mol, the Mw is 1,000 to about 20,000 g/mol, and the Mz is about 1400 (alternately 1700) to about 150,000 g/mol.

22. The process of any of paragraphs 8 through 21, wherein the alkene metathesis catalyst is represented by the Formula (I):

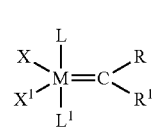

Formula (I)

where:
M is a Group 8 metal;
X and $X^1$ are, independently, any anionic ligand, or X and $X^1$ may be joined to form a dianionic group and may form single ring of up to 30 non-hydrogen atoms or a multinuclear ring system of up to 30 non-hydrogen atoms;
L and $L^1$ are neutral two electron donors, L and $L^1$ may be joined to form a single ring of up to 30 non-hydrogen atoms or a multinuclear ring system of up to 30 non-hydrogen atoms;
L and X may be joined to form a bidentate monoanionic group and may form single ring of up to 30 non-hydrogen atoms or a multinuclear ring system of up to 30 non-hydrogen atoms;
$L^1$ and $X^1$ may be joined to form a multidentate monoanionic group and may form single ring of up to 30 non-hydrogen atoms or a multinuclear ring system of up to 30 non-hydrogen atoms;
R and $R^1$ are, independently, hydrogen or $C_1$ to $C_{30}$ substituted or unsubstituted hydrocarbyl;
$R^1$ and $L^1$ or $X^1$ may be joined to form single ring of up to 30 non-hydrogen atoms or a multinuclear ring system of up to 30 non-hydrogen atoms; and
R and L or X may be joined to form single ring of up to 30 non-hydrogen atoms or a multinuclear ring system of up to 30 non-hydrogen atoms.

23. The process of paragraph 22, wherein:
M is Ru or OS;
X and $X^1$ are, independently, a halogen, an alkoxide or a triflate, or X and $X^1$ may be joined to form a dianionic group and may form single ring of up to 30 non-hydrogen atoms or a multinuclear ring system of up to 30 non-hydrogen atoms;
L and $L^1$ are, independently, a phosphine or a N-heterocyclic carbene, L and $L^1$ may be joined to form a single ring of up to 30 non-hydrogen atoms or a multinuclear ring system, of up to 30 non-hydrogen atoms;
L and X may be joined to form a multidentate monoanionic group and may form single ring of up to 30 non-hydrogen atoms or a multinuclear ring system of up to 30 non-hydrogen atoms;
$L^1$ and $X^1$ may be joined to form a multidentate monoanionic group and may form single ring of up to 30 non-hydrogen atoms or a multinuclear ring system of up to 30 non-hydrogen atoms;
R and $R^1$ are, independently, hydrogen or a $C_1$ to $C_{30}$ substituted or unsubstituted alkyl or a substituted or unsubstituted $C_4$ to $C_{30}$ aryl;
$R^1$ and $L^1$ or $X^1$ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

24. The process of paragraphs 8 through 23, wherein the vinyl terminated polyolefin is prepared by a process having productivity of at least $4.5 \times 10^3$ g/mmol/hr, comprising:

contacting, at a temperature of from 35° C. to 150° C., propylene, 0.1 to 70 mol % ethylene and from 0 wt % to about 5 wt % hydrogen in the presence of a catalyst system comprising an activator and at least one metallocene compound represented by the formulae:

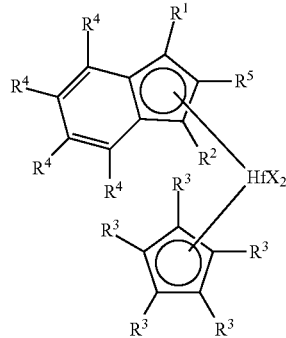

I

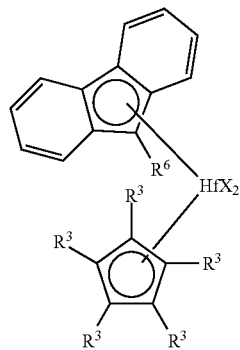

II

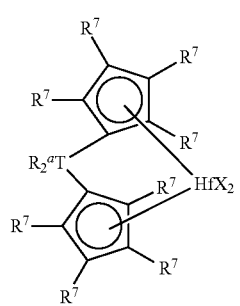

III

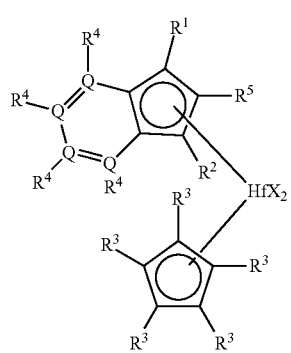

IV where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);
each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);
each $R^1$ is, independently, a $C_1$ to $C_8$ alkyl group, preferably a $C_1$ to $C_8$ linear alkyl group, preferably methyl ethyl, propyl, butyl, pentyl, hexyl, heptyl, or octyl, $R^1$ may the same or different as $R^2$;
each $R^2$ is, independently, a $C_1$ to $C_8$ alkyl group, preferably a $C_1$ to $C_8$ linear alkyl group, preferably methyl ethyl, propyl, butyl, pentyl, hexyl, heptyl, or octyl, preferably $R^1$ and/or $R^2$ are not branched;
each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided, however, that at least three $R^3$ groups are not hydrogen (alternately four $R^3$ groups are not hydrogen, alternately five $R^3$ groups are not hydrogen);
each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);
$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;
$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;
each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl, or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);
N is nitrogen;
T is a bridge, preferably, Si or Ge, preferably Si;
each $R^a$, is independently, hydrogen, halogen, or a $C_1$ to $C_{20}$ hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system; and
further provided that any two adjacent R groups may form a fused ring or multicenter fused ring system where the rings may be aromatic, partially saturated or saturated.

25. The process of paragraphs 8 through 23, wherein the vinyl terminated polyolefins is prepared by a homogeneous process having productivity of at least $4.5 \times 10^6$ g/mmol/hr, comprising:

contacting, at a temperature of from 30° C. to 120° C., propylene, 0 mol % comonomer and from 0 wt % to about 5 wt % hydrogen in the presence of a catalyst system comprising an activator and at least one metallocene compound represented by the formulae:

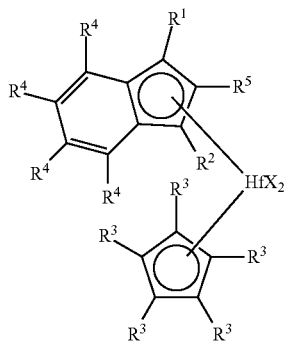

I

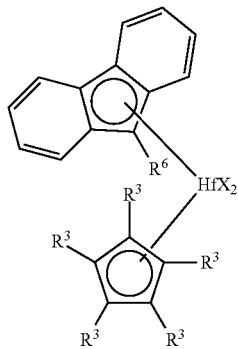

II

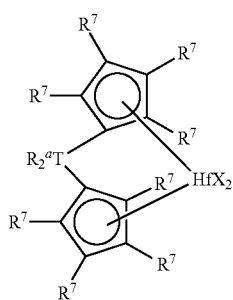

III

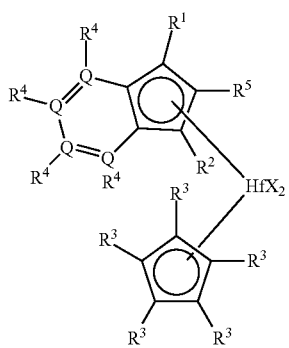

IV where

Hf is hafnium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);

each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);

each $R^1$ is, independently, a $C_1$ to $C_8$ alkyl group, preferably a $C_1$ to $C_8$ linear alkyl group, preferably methyl ethyl, propyl, butyl, pentyl, hexyl, heptyl, or octyl, $R^1$ may the same or different as $R^2$;

each $R^2$ is, independently, a $C_1$ to $C_8$ alkyl group, preferably a $C_1$ to $C_8$ linear alkyl group, preferably methyl ethyl, propyl, butyl, pentyl, hexyl, heptyl, or octyl, preferably $R^1$ and/or $R^2$ are not branched;

each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl, or 2) four $R^3$ groups are not hydrogen and at least one $R^3$ group is a $C_2$ to $C_8$ substituted or unsubstituted hydrocarbyl (preferably at least two, three, four or five $R^3$ groups are a $C_2$ to $C_8$ substituted or unsubstituted hydrocarbyl);

each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);

$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;

$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl, or octyl;

each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl, or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);

N is nitrogen;

T is a bridge, preferably, Si or Ge, preferably Si;

each $R^a$, is independently, hydrogen, halogen or a $C_1$ to $C_{20}$ hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated.

26. The process of paragraphs 24 or 25, wherein the activator comprises one or more non-coordinating anions.

27. The process of paragraphs 8 through 23, wherein the vinyl terminated polyolefin is produced using the catalyst compound represented by the formula:

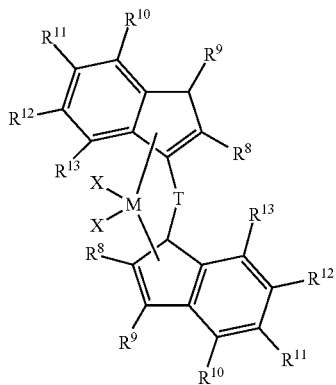

where

M is hafnium or zirconium (preferably hafnium);

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably each X is independently selected from halides and $C_1$ to $C_5$ alkyl groups, preferably each X is a methyl group);

each $R^8$ is, independently, a $C_1$ to $C_{10}$ alkyl group (preferably methyl, ethyl, propyl, butyl, pentyl, hexyl, or isomers thereof, preferably each $R^8$ is a methyl group);

each $R^9$ is, independently, a $C_1$ to $C_{10}$ alkyl group (preferably methyl, ethyl, propyl, butyl, pentyl, hexyl, or isomers thereof, preferably each $R^9$ is a n-propyl group);

each $R^{10}$ is hydrogen;

each $R^{11}$, $R^{12}$, and $R^{13}$, is, independently, hydrogen or a substituted or unsubstituted hydrocarbyl group, a heteroatom or heteroatom containing group (preferably hydrogen);

T is a bridging group (preferably T is dialkyl silicon or dialkyl germanium, preferably T is dimethyl silicon); and further provided that any of adjacent $R^{11}$, $R^{12}$, and $R^{13}$ groups may form a fused ring or multicenter fused ring system where the rings may be aromatic, partially saturated or saturated; preferably by one or more of:

rac-dimethylsilyl bis(2-methyl,3-propylindenyl)hafniumdimethyl,
rac-dimethylsilyl bis(2-methyl,3-propylindenyl)zirconiumdimethyl,
rac-dimethylsilyl bis(2-ethyl,3-propylindenyl)hafniumdimethyl,
rac-dimethylsilyl bis(2-ethyl,3-propylindenyl)zirconiumdimethyl,
rac-dimethylsilyl bis(2-methyl,3-ethylindenyl)hafniumdimethyl,
rac-dimethylsilyl bis(2-methyl,3-ethylindenyl)zirconiumdimethyl,
rac-dimethylsilyl bis(2-methyl,3-isopropylindenyl)hafniumdimethyl,
rac-dimethylsilyl bis(2-methyl,3-isopropylindenyl)zirconiumdimethyl,
rac-dimethylsilyl bis(2-methyl,3-butyllindenyl)hafniumdimethyl,
rac-dimethylsilyl bis(2-methyl,3-butylindenyl)zirconiumdimethyl,
rac-dimethylgermanyl bis(2-methyl,3-propylindenyl)hafniumdimethyl,
rac-dimethylgermanyl bis(2-methyl,3-propylindenyl)zirconiumdimethyl,
rac-dimethylgermanyl bis(2-ethyl,3-propylindenyl)hafniumdimethyl,
rac-dimethylgermanyl bis(2-ethyl,3-propylindenyl)zirconiumdimethyl,
rac-dimethylgermanyl bis(2-methyl,3-ethylindenyl)hafniumdimethyl,
rac-dimethylgermanyl bis(2-methyl,3-ethylindenyl)zirconiumdimethyl,
rac-dimethylgermanyl bis(2-methyl,3-isopropylindenyl)hafniumdimethyl,
rac-dimethylgermanyl bis(2-methyl,3-isopropylindenyl)zirconiumdimethyl,
rac-dimethylgermanyl bis(2-methyl,3-butyllindenyl)hafniumdimethyl,
rac-dimethylgermanyl bis(2-methyl,3-propylindenyl)zirconiumdimethyl,
rac-dimethylsilyl bis(2-propyl,3-methylindenyl)hafniumdimethyl,
rac-dimethylsilyl bis(2-propyl,3-methylindenyl)zirconiumdimethyl,
rac-dimethylsilyl bis(2-propyl,3-ethylindenyl)hafniumdimethyl,
rac-dimethylsilyl bis(2-propyl,3-ethylindenyl)zirconiumdimethyl,
rac-dimethylsilylbis(2-propyl,3-butylindenyl)hafniumdimethyl,
rac-dimethylsilylbis(2-propyl,3-butylindenyl)zirconiumdimethyl,
rac-dimethylsilyl bis(2-methyl,3-butylindenyl)hafniumdimethyl,
rac-dimethylsilyl bis(2-methyl,3-butylindenyl)zirconiumdimethyl,
rac-dimethylsilyl bis(2,3-dimethyl)hafniumdimethyl,
rac-dimethylsilyl bis(2,3-dimethyl)zirconiumdimethyl,
rac-dimethylgermanyl bis(2-propyl,3-methylindenyl)hafniumdimethyl,
rac-dimethylgermanyl bis(2-propyl,3-methylindenyl)zirconiumdimethyl,
rac-dimethylgermanyl bis(2-propyl,3-ethylindenyl)hafniumdimethyl,
rac-dimethylgermanyl bis(2-propyl,3-ethylindenyl)zirconiumdimethyl,
rac-dimethylgermanyl bis(2-propyl,3-butylindenyl)hafniumdimethyl,
rac-dimethylgermanyl bis(2-propyl,3-butylindenyl)zirconiumdimethyl,
rac-dimethylgermanyl bis(2-methyl,3-butylindenyl)hafniumdimethyl,
rac-dimethylgermanyl bis(2-methyl,3-butylindenyl)zirconiumdimethyl,
rac-dimethylgermanyl bis(2,3-dimethyl)hafniumdimethyl, and
rac-dimethylgermanyl bis(2,3-dimethyl)zirconiumdimethyl,
alternately the "dimethyl" after the transition metal in the list of catalyst compounds above is replaced with a dihalide (such as dichloride or difluoride) or a bisphenoxide, particularly for use with an alumoxane activator.

28. The process of paragraphs 8 through 23, wherein the vinyl terminated polyolefin is produced using the catalyst compound represented by the formula:

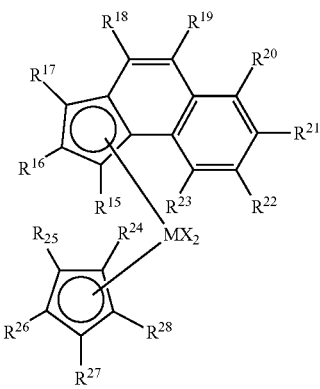

wherein
M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof; each $R^{15}$ and $R^{17}$ are, independently, a $C_1$ to $C_8$ alkyl group (preferably a $C_1$ to $C_8$ linear alkyl group, preferably methyl ethyl, propyl, butyl, pentyl, hexyl, heptyl, or octyl); and each $R^{16}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are, independently, hydrogen, or a substituted or unsubstituted hydrocarbyl group having from 1 to 8 carbon atoms (preferably 1 to 6 carbon atoms, preferably a substituted or unsubstituted $C_1$ to $C_8$ linear alkyl group, preferably methyl ethyl, propyl, butyl, pentyl, hexyl, heptyl, octyl), preferably at least three of $R^{24}$-$R^{28}$ groups are not hydrogen (alternately four of $R^{24}$-$R^{28}$ groups are not hydrogen, alternately five of $R^{24}$-$R^{28}$ groups are not hydrogen), preferably all five groups of $R^{24}$-$R^{28}$ are methyl, preferably four of the $R^{24}$-$R^{28}$ groups are not hydrogen and at least one of the $R^{24}$-$R^{28}$ groups is a $C_2$ to $C_8$ substituted or unsubstituted hydrocarbyl (preferably at least two, three, four or five of $R^{24}$-$R^{28}$ groups are a $C_2$ to $C_8$ substituted or unsubstituted hydrocarbyl), preferably $R^{15}$ and $R^{17}$ are methyl groups, $R^{16}$ is a hydrogen, $R^{18}$-$R^{23}$ are all hydrogens, $R^{24}$-$R^{28}$ are all methyl groups, and each X is a methyl group, preferably the catalyst compound is one or more of $(CpMe_5)(1,3-Me_2-benz[e]indenyl)HfMe_2$, $(CpMe_5)$ (1-methyl-3-n-propylbenz[e]indenyl)HfMe$_2$, $(CpMe_5)(1$-n-propyl,3-methylbenz[e]indenyl)HfMe$_2$, $(CpMe_5)(1$-methyl-3-n-butylbenz[e]indenyl)HfMe$_2$, $(CpMe_5)(1$-n-butyl, 3-methylbenz[e]indenyl)HfMe$_2$, $(CpMe_5)(1$-ethyl,3-methyl-benz[e]indenyl)HfMe$_2$, $(CpMe_5)(1$-methyl, 3-ethylbenz[e] indenyl)HfMe$_2$, $(CpMe_4$n-propyl)(1,3-Me$_2$-benz[e]indenyl) HfMe$_2$, $(CpMe_4$-n-propyl)(1-methyl-3-n-propylbenz[e] indenyl)HfMe$_2$, $(CpMe_4$-n-propyl) (1-n-propyl,3-methylbenz[e]indenyl)HfMe$_2$, $(CpMe_4$-n-propyl)(1-methyl-3-n-butylbenz[e]indenyl)HfMe$_2$, $(CpMe_4$-n-propyl)(1-n-butyl,3-methylbenz[e]indenyl)HfMe$_2$, $(CpMe_4$-n-propyl) (1-ethyl,3-methylbenz[e]indenyl)HfMe$_2$, $(CpMe_4$-n-propyl) (1-methyl, 3-ethylbenz[e]indenyl)HfMe$_2$, $(CpMe_4$n-butyl) (1,3-Me$_2$-benz[e]indenyl)HfMe$_2$, $(CpMe_4$n-butyl) (1-methyl-3-n-propylbenz[e]indenyl)HfMe$_2$, $(CpMe_4$n-butyl) (1-n-propyl, 3-methylbenz[e]indenyl)HfMe$_2$, $(CpMe_4$n-butyl)(1-methyl-3-n-butylbenz[e]indenyl)HfMe$_2$, $(CpMe_4$n-butyl)(1-n-butyl,3-methylbenz[e]indenyl)HfMe$_2$, $(CpMe_4$n-butyl)(1-ethyl, 3-methylbenz[e]indenyl)HfMe$_2$, $(CpMe_4$n-butyl)(1-methyl, 3-ethylbenz[e]indenyl)HfMe$_2$, and the zirconium analogs thereof, alternately the "dimethyl" (Me$_2$) after the transition metal in the list of catalyst compounds above is replaced with a dihalide (such as dichloride or difluoride) or a bisphenoxide, particularly for use with an alumoxane activator.

29. The process of any of paragraphs 8 to 28, wherein the activator is a bulky activator represented by the formula:

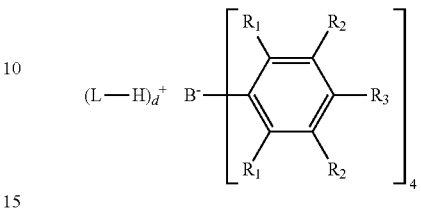

where
each $R_1$ is, independently, a halide, preferably a fluoride;
each $R_2$ is, independently, a halide, a $C_6$ to $C_{20}$ substituted aromatic hydrocarbyl group or a siloxy group of the formula —O—$S_1$—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—$S_1$—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is an neutral Lewis base; (L-H)$^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å, 30. The process of any of paragraphs 8 to 28, wherein the activator is one or more of: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis (perfluoronaphthyl)borate, tri(t-butyl)ammonium tetrakis (perfluoronaphthyl)borate, N,N-dimethylanilinium tetrakis (perfluoronaphthyl)borate, N,N-diethylanilinium tetrakis (perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis (perfluorobiphenyl)borate, [4-t-butyl-PhNMe$_2$H][(C$_6$F$_3$(C$_6$F$_5$)$_2$)$_4$B], and the types disclosed in U.S. Pat. No. 7,297,653.

31. The process of paragraphs 8 through 30, wherein the activator comprises one or more of: dimethylaniliniumtetrakis(pentafluorophenyl) borate, dimethylaniliniumtetrakis(heptafluoronaphthyl) borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, and [4-t-butyl-PhNMe$_2$H][(C$_6$F$_3$(C$_6$F$_5$)$_2$)$_4$B] (where Ph is phenyl and Me is methyl).

EXAMPLES

Tests and Materials

Products were characterized by $^1$H NMR and DSC as follows.

$^1$H NMR $^1$H NMR data was collected at either room temperature or 120° C. (for purposes of the claims, 120° C. shall be used) in a 5 mm probe using a Varian spectrometer with a $^1$Hydrogen frequency of at least 400 MHz. Data was recorded using a maximum pulse width of 45°, 8 seconds between pulses and signal averaging 120 transients. Spectral signals were integrated and the number of unsaturation types per 1000 carbons was calculated by multiplying the different groups by 1000 and dividing the result by the total number of carbons.

DSC

Melting temperature (T$_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., and then it is cooled at a cooling rate of 10° C./min to –80° C. The sample is held at –80° C. for 5 min and then heated at a heating rate of 10° C./min to 25° C. The glass transition temperature is measured from the heating cycle. Alternatively, the sample is equilibrated at 25° C., and then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

All molecular weights are number average unless otherwise noted. All Molecular weights are reported in g/mol.

The following abbreviations are used in the Examples: aPP is atactic polypropylene, iPP is isotactic polypropylene, EP is ethylene-propylene copolymer, TCE is 1,1,2,2-tetrachloroethane, h is hours, min is minutes, M$_n$ is the number average molecular weight as determined by $^1$H NMR spectroscopy by comparison of integrals of the aliphatic region to the olefin region as determined using the protocol described in the Experimental section of WO2009/155471, Zhan 1B is 1,3-Bis(2,4,6-trimethylphenyl)-4,5-dihydroimidazol-2-ylidene[2-(1-propoxy)-5-(N,N-dimethylaminosulfonyl)phenyl]methyleneruthenium(II) dichloride.

Example 1

Synthesis of PE-PEG-PE triblock

1-Eicosene (1.08 g, 3.84 mmol), poly(ethylene glycol)diacrylate (1.59 g, 2.05 mmol) with an estimated Mn of 777 g/mol, and Zhan 1B (0.0175 g, 0.0239 mmol) were combined in a vial. Then pentane (4 mL) and dichloromethane (4 mL) were added to form a homogeneous mixture that was heated on a metal block kept at 45° C. Additional pentane was added periodically as the mixture evaporated for a few hours. The mixture was kept at 39° C. overnight. At this time $^1$H NMR spectroscopy indicated that 94% of the acrylate groups had undergone cross metathesis with eicosene with loss of ethylene. The reaction was quenched by the addition of a few drops of ethyl vinyl ether. Pentane (100 mL) was added and the mixture was passed slowly down a column of neutral alumina, with some loss of product that precipitated on the column. The volatiles were removed under vacuum to afford the product as a white solid. Yield: 1.2 g. $^1$H NMR (250 MHz, CDCl$_3$): δ 6.97 (dt, 2.0H), 5.82 (d, 2.1H), 4.29 (pseudo t, 4.4H), 3.70 (pseudo t, 4.4H), 3.62 (m, 42.7H), 2.17 (q, 4.0H), 1.63 (s, 2.4H, water), 1.1-1.5 (m, 69.2H), 0.86 (t, 6.7H).

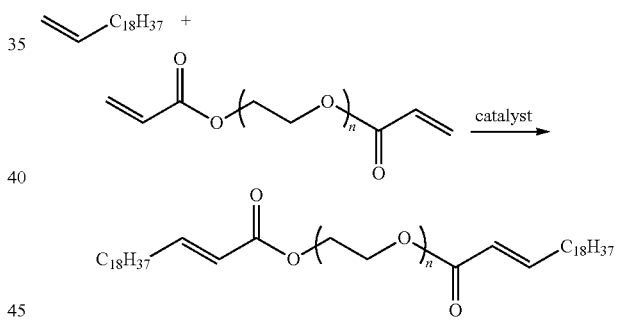

where n is about 15.

Example 2

Synthesis of PE-PEG diblock

1-Eicosene (2.38 g, 8.48 mmol) and poly(ethylene glycol) methyl ether acrylate (4.47 g, 8.48 mmol) with an estimated Mn of 527 g/mol were combined in a vial. Dichloromethane (8 mL) was added followed by solid Zhan 1B (0.062 g, 0.0848 mmol) and some pentane (5 mL). The mixture was kept near reflux on a metal block kept at 39° C. After stirring overnight a few drops of ethyl vinyl ether were added. After 0.5 h the volatiles were removed and pentane (100 mL) was added. This mixture was slowly passed through neutral alumina. Removal of the volatiles afforded the diblock product as a white semi solid. Yield 2.53 g. $^1$H NMR (500 MHz, CDCl$_3$): δ 6.96 (dt, 1.0H), 5.81 (d, 1.0H), 4.29 (m, 2.0H), 3.70 (m, 2.0H), 3.62 (m, 21.3H), 3.51 (m, 1.8H), 3.35 (s, 2.7H), 2.16 (q, 2.0H), 1.15-1.46 (m, 35.8H), 0.85 (t, 3.3H).

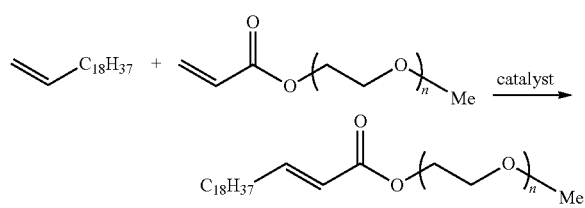

where n=about 10.

Example 3

Synthesis of $^i$PP-PEG diblock

Isotactic polypropylene (4.29 g, 0.361 mmol) with an $M_n$ of 11900 and 85% vinyl termination was combined with toluene (40 mL), and the mixture was heated to 100° C. to form a clear colorless solution. The mixture was cooled to about 65° C. and poly(ethylene glycol) methyl ether acrylate (0.500 g, 0.948 mmol) with an estimated $M_n$ of 527 and dichloromethane (10 mL) were added followed by Zhan 1B (0.0265 g, 0.0361 mmol). The mixture was kept at 60° C. overnight then poured into stirring methanol (300 mL). The white solid was collected on a frit and thoroughly washed with methanol. The product was dried at 70° C. under reduced pressure for 3 days. Yield 4.27 g. NMR analysis indicated absence of vinyl groups and the formation of the PP-PEG block product and about 0.2 molar equivalents of an impurity thought to be the homocoupled PEG-acrylate (i.e., (MeO (CH$_2$CH$_2$O)$_n$C(O)CH=CHC(O)(OCH$_2$CH$_2$)$_n$PMe). $^1$H NMR (500 MHz, D$_4$-tetrachloroethane): δ 6.99 (dt, 1.0H), 6.90 (s, 0.4H, impurity), 5.87 (d, 1.2H), 4.39 (t, 0.9H, impurity), 4.30 (t, 2H), 3.5-3.8 (m, 68.8H), 3.40 (s, 5.7H, product and impurity), 0.8-1.8 (m, 3080H).

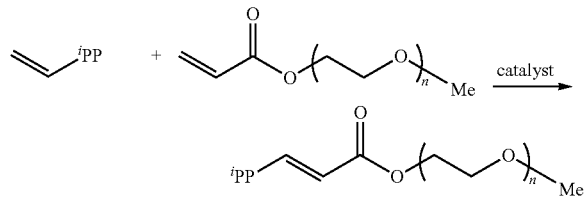

where n is about 10.

All documents described herein are incorporated by reference herein for purposes of all jurisdictions where such practice is allowed, including any priority documents, related applications and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A functionalized multiblock polyolefin represented by the formula:

$$PO-C(R^{11})(R^{12})-C(R^{13})=C(R^{14})-C(O)-O-((CR^{15}R^{16})_z-(CR^{17}R^{18})_m-O)_n-R^{19} \quad (X)$$

or $$PO-C(R^{11})(R^{12})-C(R^{13})=C(R^{14})-C(O)-O-((CR^{15}R^{16})_z-(CR^{17}R^{18})_m O)_n-C(O)-C(R^{14})=C(R^{13})-C(R^{12})(R^{11})-PO \quad (XX)$$

wherein $R^{11}$, $R^{12}$, $R^{13}$, and $R^{14}$ are each independently a substituted or unsubstituted $C_1$ through $C_4$ hydrocarbyl group or a hydrogen;

$R^{15}$, $R^{16}$, $R^{17}$, and $R^{18}$ are each independently a substituted or unsubstituted $C_1$ through $C_4$ hydrocarbyl group or a hydrogen;

$R^{19}$ is a $C_1$ to a $C_{20}$ substituted or unsubstituted hydrocarbyl group or a hydrogen;

z is ≥1 to about 5;

m is ≥1 to about 5;

PO is a polyolefin comprising 10 to 4000 carbon atoms selected from the group consisting of isotactic polypropylene, atactic polypropylene, ethylene-propylene copolymer, and polyethylene; and n is from 1 to about 10,000.

2. The multiblock polyolefin of claim 1, wherein the polyolefin is represented by Formula (X) and $R^{11}$, $R^{12}$, $R^{13}$, $R^{14}$, $R^{15}$, $R^{16}$, $R^{17}$, and $R^{18}$ are each hydrogen atoms and $R^{19}$ is a hydrogen, a methyl or an ethyl group.

3. The multiblock polyolefin of claim 1, wherein z is 1, m is 1, and n is from 2 to about 1000.

4. The multiblock polyolefin of claim 1, wherein z is 2, m is 1, and n is from 2 to about 1000.

5. The multiblock polyolefin of claim 1, wherein z is 2, m is 2, and n is from 2 to about 1000.

6. The multiblock polyolefin of claim 1, wherein PO has 15 to 4000 carbon atoms.

7. The multiblock polyolefin of claim 1, wherein PO has 100 to 4000 carbon atoms.

8. The multiblock polyolefin of claim 1, wherein n is from 4 to 50.

9. The multiblock polyolefin of claim 1, wherein n is from 4 to 20.

10. The multiblock polyolefin of claim 1, wherein the multiblock polyolefin is the reaction product of a vinyl terminated polyolefin with an acrylate or methacrylate functionalized polyalkylene glycol to produce an ester functionalized multiblock polyolefin.

* * * * *